(12) United States Patent
Ikeda

(10) Patent No.: US 12,518,368 B2
(45) Date of Patent: Jan. 6, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Satoshi Ikeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 385 days.

(21) Appl. No.: 18/181,443

(22) Filed: Mar. 9, 2023

(65) Prior Publication Data

US 2023/0316491 A1 Oct. 5, 2023

(30) Foreign Application Priority Data

Apr. 5, 2022 (JP) .................... 2022-062971

(51) Int. Cl.
- *G06T 7/00* (2017.01)
- *G06T 7/50* (2017.01)
- *H04N 23/80* (2023.01)

(52) U.S. Cl.
CPC .............. *G06T 7/0004* (2013.01); *G06T 7/50* (2017.01); *H04N 23/80* (2023.01); *G06T 2200/24* (2013.01); *G06T 2207/10148* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 2014/0192216 A1* | 7/2014 | Matsumoto | H04N 23/61 348/222.1 |
| 2019/0268542 A1* | 8/2019 | Yamazaki | G06V 40/166 |
| 2020/0274994 A1* | 8/2020 | Sunaga | G03B 17/18 |
| 2021/0195099 A1* | 6/2021 | Kawai | H04N 23/676 |
| 2023/0072475 A1* | 3/2023 | Komatsu | H04N 23/80 |

FOREIGN PATENT DOCUMENTS

| JP | 2005277813 A | 10/2005 |
|---|---|---|
| JP | 2017173300 A | 9/2017 |

OTHER PUBLICATIONS

Sone, T. and Watanabe, S., "Measurement and Evaluation Method of Orange Peel", https://doi.org/10.2352/ISSN.2470-1173.2017.8.MAAP-283 (Year: 2017).*

* cited by examiner

*Primary Examiner* — Chan S Park
*Assistant Examiner* — Promotto Tajrian Islam
(74) *Attorney, Agent, or Firm* — Canon U.S.A., Inc. IP Division

(57) ABSTRACT

An image processing apparatus acquires a plurality of images obtained by capturing images of an object to be evaluated at a plurality of focal positions, and acquires a plurality of optical profiles representing attributes of an image on a surface of the object based on the plurality of images. The image processing apparatus combines the acquired plurality of optical profiles to generate a combined profile, and acquires an evaluation value representing a condition of the surface of the object based on the generated combined profile.

14 Claims, 21 Drawing Sheets

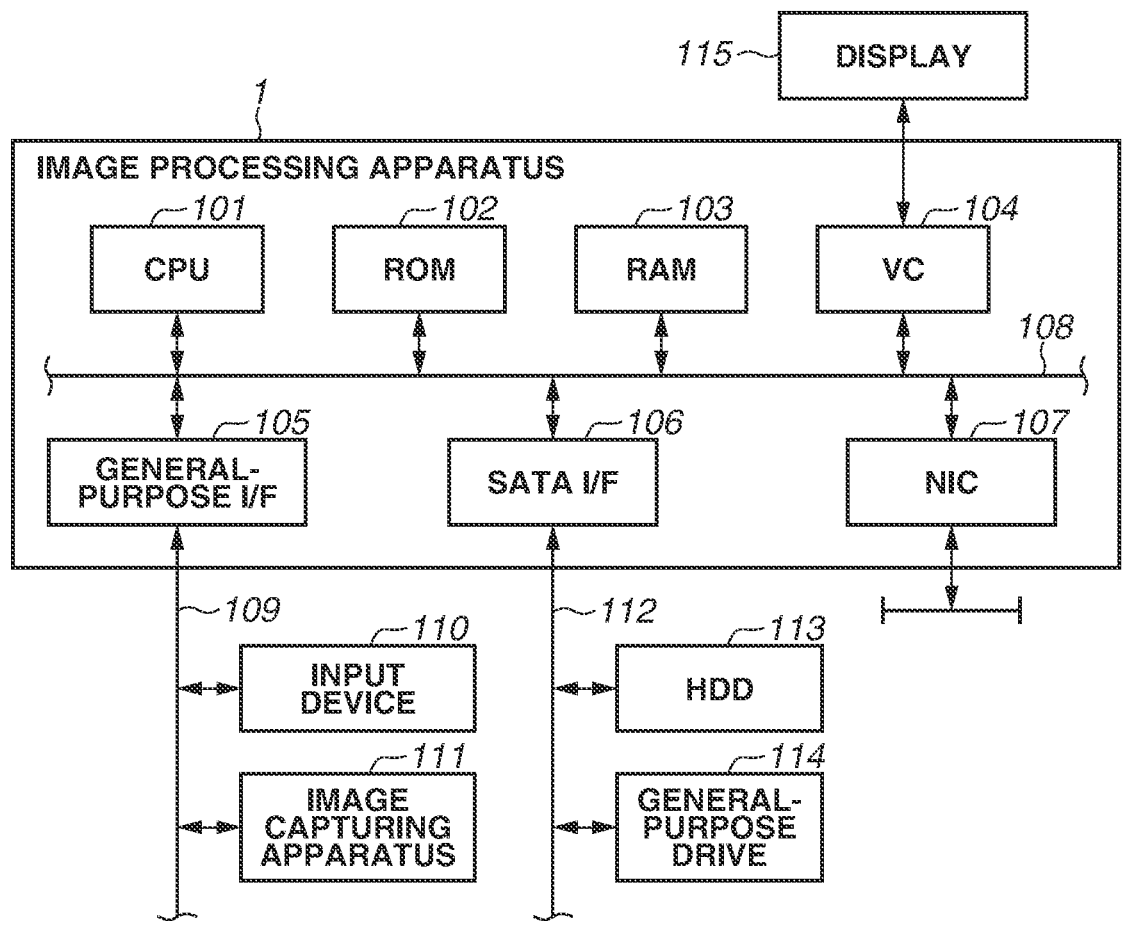
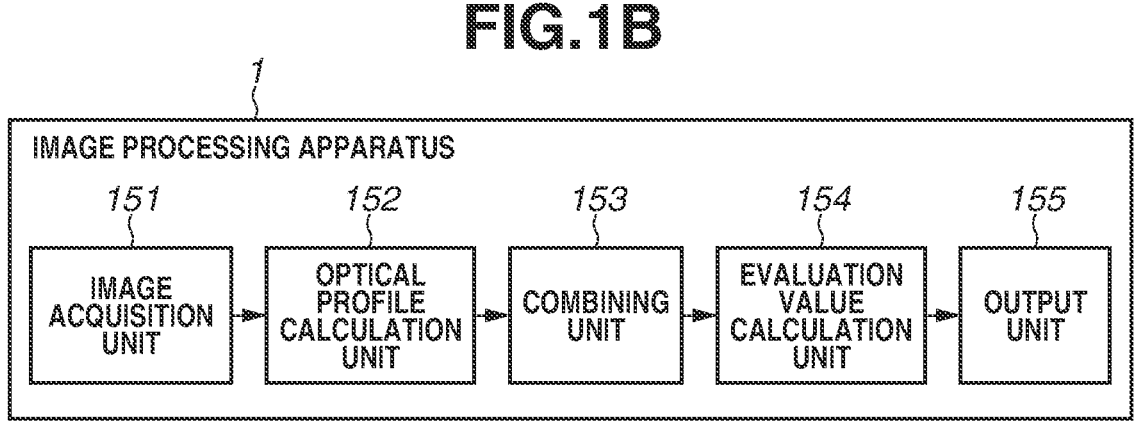

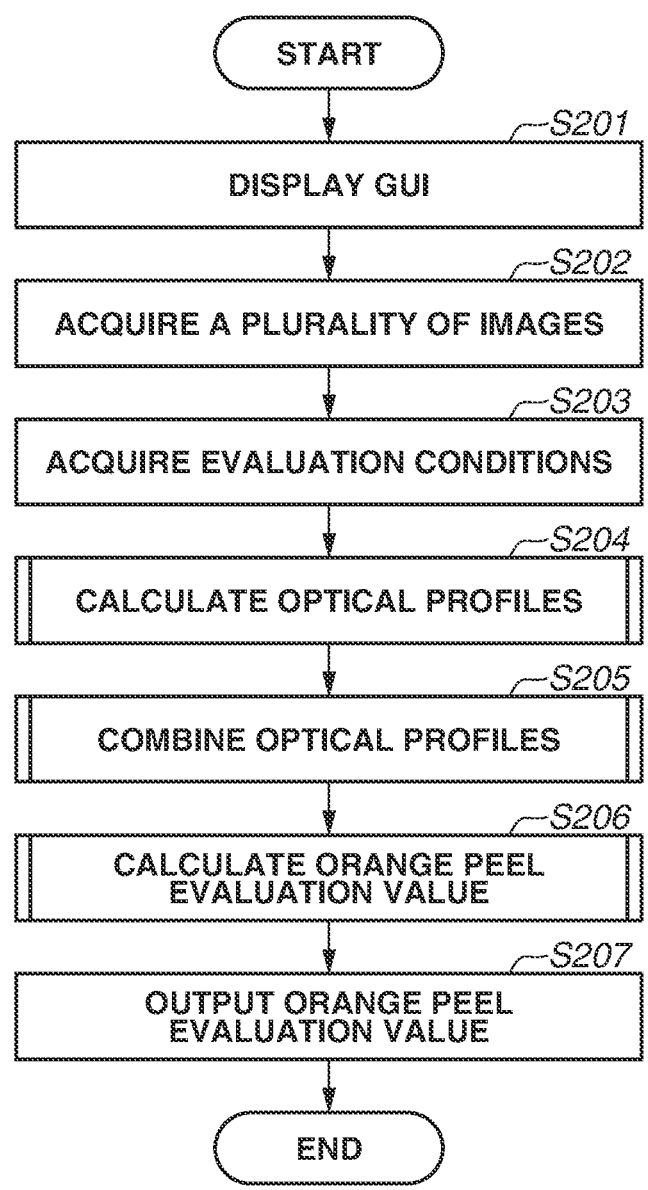

TOP VIEW $P_0(x)$ $P_1(x)$ $V_0(x)$ $V_1(x)$ $P(x)$

FIG.15

| ORANGE PEEL EVALUATION VALUE | THRESHOLD |
|---|---|
| EVALUATION VALUE 1 (0.1 - 0.3 mm) | 0.1 |
| EVALUATION VALUE 2 (0.3 - 1.0 mm) | 0.2 |
| EVALUATION VALUE 3 (1.0 - 3.0 mm) | 0.4 |

| FOCAL LENGTH | F-VALUE | DISTANCE TO SUBJECT | DEPTH OF FIELD |
|---|---|---|---|
| 50 mm | 10 | 1 m | 80 mm |
| 90 mm | 8 | 1 m | 20 mm |

TO CALCULATE ORANGE PEEL EVALUATION VALUE ON DESIGNATED REGION, YOU NEED TO CAPTURE A PLURALITY OF IMAGES BY SHIFTING FOCAL POSITION.

IS PROCESSING TO BE CONTINUED?

2101

| CONTINUE PROCESSING |

2102

| RESET EVALUATION REGION |

IMAGE PROCESSING APPARATUS, IMAGE PROCESSING METHOD, AND STORAGE MEDIUM

BACKGROUND

Field of the Disclosure

The present disclosure relates to a technique for evaluating a surface condition of an object.

Description of the Related Art

In the field of industrial design, it is important to check the surface condition of an object that contributes to an improvement in designability. Japanese Patent Application Laid-Open No. 2017-173300 discusses a method for capturing an image of a projection pattern projected on the surface of an object with a camera and evaluating the surface condition of the object based on the variation amount in the shape of the projection pattern in the captured image and preliminarily acquired sensory evaluation information.

However, if the object has no flat surface and has a curved structure, the depth of the object surface exceeds the depth of field of the camera, so that a part of the captured image is blurred. If a part of the captured image is blurred, it may be difficult to accurately acquire the variation amount in the shape of the projection pattern, which makes it difficult to calculate an accurate evaluation value.

SUMMARY

Some embodiments of the present disclosure are directed to providing a technique for accurately evaluating the surface condition of any object, such as an object having a curved structure.

According to an aspect of the present disclosure, an image processing apparatus includes an image acquisition unit configured to acquire a plurality of images obtained by capturing images of an object to be evaluated at a plurality of focal positions, a profile acquisition unit configured to acquire a plurality of optical profiles representing attributes of an image on a surface of the object based on the plurality of images, a combining unit configured to combine the plurality of optical profiles to generate a combined profile, and an evaluation value acquisition unit configured to acquire an evaluation value representing a condition of the surface of the object based on the combined profile.

Further features of various embodiments will become apparent from the following description of exemplary embodiments with reference to the attached drawings.

BRIEF DESCRIPTION OF THE DRAWINGS

FIGS. 1A and 1B are block diagrams each illustrating a configuration example of an image processing apparatus according to a first exemplary embodiment.

FIG. 2 is a flowchart illustrating image processing to be performed by the image processing apparatus according to the first exemplary embodiment.

FIG. 15 is a table illustrating examples of a threshold for optical profile combining determination processing.

FIG. 19 is a table illustrating a relationship between image capturing conditions and a depth of field.

FIG. 21 illustrates an example of a GUI for providing a user with a notification about a combining determination processing result.

DESCRIPTION OF THE EMBODIMENTS

Figure 3A:
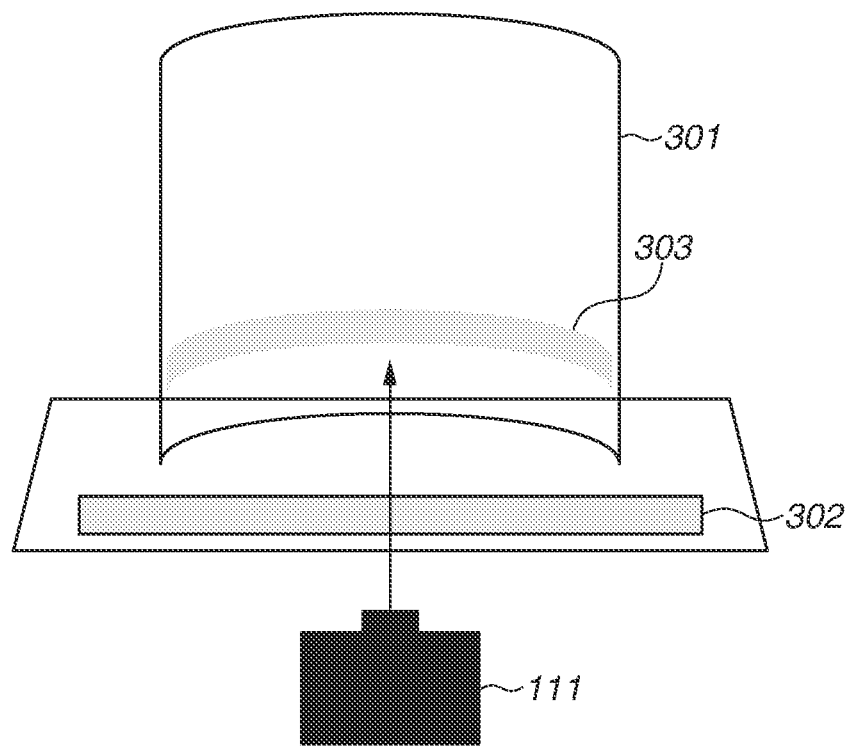
FIGS. 3A and 3B are schematic views each illustrating an example of a method for capturing an image of an object to be evaluated.

Exemplary embodiments will be described below with reference to the drawings. The following exemplary embodiments are not intended to limit every embodiment, and not all combinations of features described in the exemplary embodiments are necessarily essential to every embodiment. Configurations described in the following exemplary embodiments are merely examples, and some embodiments are not limited to the illustrated configurations.

Description of Evaluation Example of Object Surface Condition

An exemplary embodiment of the present disclosure illustrates an example where image processing is performed to evaluate so-called "orange peel" as an example of the condition of an object surface that contributes to an improvement in designability in the field of industrial design. The term "orange peel" refers to a condition where the surface of an object on which fine unevenness occurs. For example, in the case of painting the body of an automobile, paint coated on the body surface with a spray gun or the like is dried and solidified before the painted body surface is made flat and smooth. In this case, fine unevenness occurs on the body surface. This condition is called "orange peel". Unlike an intended smooth and glossy surface, the body surface on which orange peel occurs deteriorates the designability of the automobile. In the present exemplary embodiment, an evaluation value for evaluating the degree of orange peel on an object surface is calculated and the calculated evaluation value is presented to a user. This makes it possible to inform the user of the degree of unintended orange peel on the object surface. There are various conditions of orange peel, including a condition where the cycle of the unevenness is long and a condition where the cycle of the unevenness is short. In the following description, the cycle of the unevenness in the condition of orange peel is referred to as a wavelength. A condition where the wavelength of orange peel is large is referred to as a low frequency, and a condition where the wavelength of orange peel is small is referred to as a high frequency. In the present exemplary embodiment, an image of the surface of an object to be evaluated is captured by an image capturing apparatus, and an evaluation value for evaluating the surface condition of the object is calculated based on the captured image. In the present exemplary embodiment, a plurality of evaluation values is calculated depending on, for example, the wavelength of orange peel. As an example, the evaluation value for evaluating orange peel with a wavelength of 0.1 mm to 0.3 mm is "1", and the evaluation value for evaluating orange peel with a wavelength of 0.3 mm to 1.0 mm is "2".

In this case, for example, if the object has no flat surface and has a curved structure and the depth of the object surface with respect to the image capturing apparatus exceeds the depth of field of the image capturing apparatus, a part of the object in the captured image is blurred, which makes it difficult to calculate the accurate evaluation value. Japanese Patent Application Laid-Open No. 2005-277813 discusses a technique for combining in-focus regions in a plurality of images captured while shifting the focal position of the image capturing apparatus. Combining the plurality of images captured while shifting the focal position using this technique makes it possible to acquire an image of a three-dimensional object without blur.

Accordingly, it is also possible to employ a method for calculating the evaluation value for evaluating the surface condition of an object using a combined image obtained by combining a plurality of images captured while shifting the focal position. However, this method requires a large amount of calculation for image combining processing.

In the present exemplary embodiment, a plurality of images of a projection pattern on the surface of the object to be evaluated is also acquired by capturing images of the object while shifting the focal position of the image capturing apparatus. An image processing apparatus according to the present exemplary embodiment performs profile acquisition processing to acquire optical profiles representing attributes of a projection pattern image on the surface of the object to be evaluated from the captured images, instead of combining the plurality of captured images.

In the present exemplary embodiment, the term "optical profile" refers to a luminance profile obtained by converting a variation in the luminance of the projection pattern image on the surface of the object to be evaluated into a one-dimensional profile. In the present exemplary embodiment, for example, an illumination image on the surface of an illuminated object is used as the projection pattern image and each optical profile for the projection pattern image is calculated. Further, the image processing apparatus according to the present exemplary embodiment generates a combined profile by combining in-focus regions corresponding to the focal positions in a plurality of optical profiles calculated based on the plurality of images captured while shifting the focal position. In other words, the combined profile obtained by combining the in-focus regions corresponding to the focal positions in the plurality of optical profiles corresponds to the optical profile that is in focus on the entire region of the object surface having a curved structure. Further, the image processing apparatus according to the present exemplary embodiment calculates the evaluation value for evaluating the object surface based on the combined profile. With this configuration, the image processing apparatus according to the present exemplary embodiment can calculate the accurate evaluation value even when the object to be evaluated has a curved structure. Furthermore, the image processing apparatus according to the present exemplary embodiment combines a plurality of optical profiles, instead of combining a plurality of captured images, thereby making it possible to calculate the evaluation value with a small amount of calculation.

Hardware Configuration of Image Processing Apparatus

FIG. 1A is a block diagram illustrating a hardware configuration example of an image processing apparatus 1 according to a first exemplary embodiment.

The image processing apparatus 1 includes a central processing unit (CPU) 101, a read-only memory (ROM) 102, and a random access memory (RAM) 103. The image processing apparatus 1 also includes a video card (VC) 104, a general-purpose interface (I/F) 105, a serial advanced technology attachment (SATA) I/F 106, and a network interface card (NIC) 107. The CPU 101 executes an operating system (OS) and various programs stored in the ROM 102, a hard disk drive (HDD) 113, or the like using the RAM 103 as a working memory. Further, the CPU 101 controls each component via a system bus 108. Processing in flowcharts to be described below is implemented such that a program code stored in the ROM 102, the HDD 113, or the like is loaded into the RAM 103 and the loaded program code is executed by the CPU 101. The VC 104 is connected to a display 115. The general-purpose I/F 105 is connected to an input device 110, such as a mouse and a keyboard, and an image capturing apparatus 111 via a serial bus 109. The SATA I/F 106 is connected to the HDD 113 and a general-purpose drive 114 via a serial bus 112. The general-purpose drive 114 is configured to read data from various recording media and write data into various recording media.

The NIC 107 is configured to input information to an external apparatus and to output information from the external apparatus. The CPU 101 uses various recording media mounted on the HDD 113 or the general-purpose drive 114 as a storage location for various data. The CPU 101 causes a graphical user interface (GUI) provided by a program to be displayed on the display 115, and receives input information, such as a user instruction, to be received via the input device 110.

Functional Configuration of Image Processing Apparatus According to First Exemplary Embodiment FIG. 1B is a block diagram illustrating a functional configuration example of the image processing apparatus 1 according to the first exemplary embodiment. The CPU 101 reads out programs stored in the ROM 102 or the HDD 113 using the RAM 103 as a working memory and executes the programs, thereby functioning as each functional unit illustrated in FIG. 1B. The CPU 101 need not necessarily execute all processing of the functional units to be described below. The image processing apparatus 1 can be configured such that a part or all of the processing is performed by one or more processing circuits other than the CPU 101.

The image processing apparatus 1 includes an image acquisition unit 151, an optical profile calculation unit 152, a combining unit 153, an evaluation value calculation unit 154, and an output unit 155.

The image acquisition unit 151 acquires an image data set including image data on the plurality of captured images obtained such that the image capturing apparatus 111 captures images of the object to be evaluated while changing the focal position. When there is no need to particularly distinguish image data, the image data is hereinafter referred to simply as "image".

The optical profile calculation unit 152 calculates optical profiles for each image on the image data set acquired by the image acquisition unit 151.

The combining unit 153 integrates (combines) the plurality of optical profiles calculated for each image by the optical profile calculation unit 152 to thereby calculate one combined profile.

The evaluation value calculation unit 154 calculates an evaluation value based on the combined profile.

The output unit 155 outputs the evaluation value calculated by the evaluation value calculation unit 154.

Operation and Image Processing of Image Processing Apparatus

FIG. 2 is a flowchart illustrating an operation and an image processing flow to be performed by the image processing apparatus 1 illustrated in FIGS. 1A and 1B. In the description of flowcharts to be described below, "S" is added to each step number. The image processing apparatus 1 need not necessarily carry out all steps described in the flowcharts to be described below. The order of steps in the flowcharts to be described below can be changed as needed.

In step S201, the CPU 101 executes a program stored in the HDD 113 to display a GUI illustrated in FIG. 4 to be described below on the display 115. The GUI illustrated in FIG. 4 will be described in detail below.

In step S202, the image acquisition unit 151 controls the operation of the image capturing apparatus 111 based on an image capturing instruction from the user via the GUI illustrated in FIG. 4 to be described below. The image acquisition unit 151 captures a plurality of images of the object to be evaluated while shifting the focal position of the image capturing apparatus 111. The image capturing apparatus 111 can be controlled by the CPU 101. This enables the image acquisition unit 151 to acquire a plurality of images captured by the image capturing apparatus 111. Image capturing conditions and the like to be set when the image capturing apparatus 111 captures images of the object to be evaluated will be described in detail below with reference to FIGS. 3A and 3B.

In step S203, the optical profile calculation unit 152 and the evaluation value calculation unit 154 acquire evaluation conditions set by the user via the GUI illustrated in FIG. 4 to be described below. As described in detail below, the evaluation conditions according to the present exemplary embodiment include conditions for an evaluation target range and conditions for an evaluation value to be calculated. Similarly, as described in detail below, the conditions for the evaluation target range and the conditions for the evaluation value to be calculated are set by the user inputting instructions to an evaluation range designation region 403 and evaluation value-to-be-calculated designation boxes 404 illustrated in FIG. 4 to be described below through the input device 110.

In step S204, the optical profile calculation unit 152 calculates each optical profile based on the captured images by using a calculation method to be described below. Similarly, the optical profiles are calculated for each captured image as described in detail below.

In step S205, the combining unit 153 combines the plurality of optical profiles calculated for each captured image to generate the combined profile. The optical profile combining processing will be described in detail below.

In step S206, the evaluation value calculation unit 154 performs evaluation value acquisition processing to acquire the evaluation value based on the combined profile. In the present exemplary embodiment, the evaluation value calculation unit 154 calculates the evaluation value for evaluating orange peel. The processing of calculating the evaluation value for evaluating orange peel using the combined profile will be described in detail below.

In step S207, the output unit 155 outputs the evaluation value to the display 115.

Geometric Conditions for Object Image Capturing

Geometric image capturing conditions for capturing images of an object as a subject to evaluate orange peel will now be described.

Figure 3B:
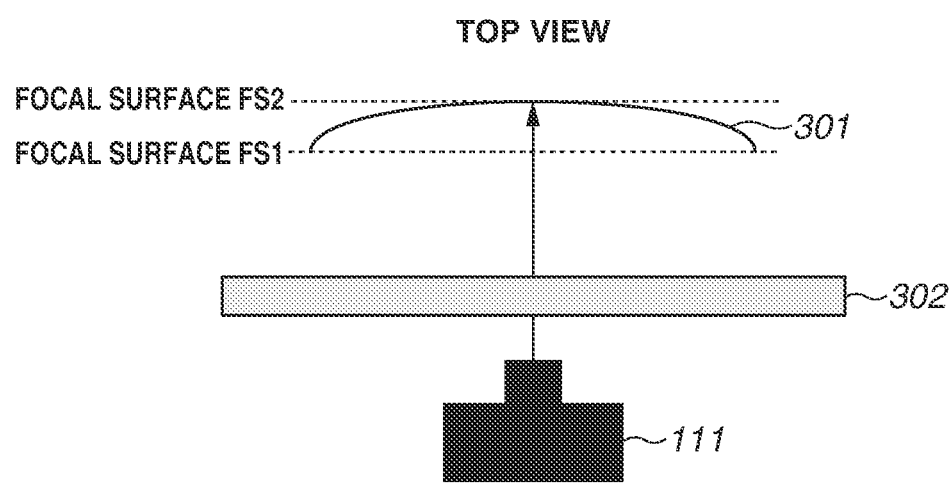

FIGS. 3A and 3B are schematic views each illustrating an example of geometric image capturing conditions for capturing images of the object to be evaluated. FIG. 3A is a schematic view illustrating a state where an object 301 to be evaluated is viewed from the front side under the geometric image capturing conditions. FIG. 3B is a schematic view illustrating a state where the object 301 and the image capturing apparatus 111 are viewed from the top side under the geometric image capturing conditions. The object 301 is the subject to be evaluated. The object 301 may have a surface other than a flat surface. In the present exemplary embodiment, the object 301 has, for example, a concave curved shape in which the central portion of the object 301 is located farther from the image capturing apparatus 111 than each end portion of the object 301, as illustrated in FIG. 3A. An illumination light source 302 is a linearly shaped illumination that illuminates the object 301. The illumination light source 302 is installed at a position that is located at a certain distance from the object 301 so as not to be in contact with the object 301.

Under the geometric image capturing conditions illustrated in FIGS. 3A and 3B, a part of light from the illumination light source 302 is projected on the surface of the object 301. Thus, the light from the illumination light source 302 is projected on the surface of the object 301 as an illumination image 303. Under the geometric image capturing conditions, assume that the user causes the image capturing apparatus 111 to focus on, for example, the forefront, i.e., a focal surface FS1 illustrated in FIG. 3B, of the object 301. However, since the object 301 has a curved structure instead of a flat surface under the geometric image capturing conditions, each image obtained by capturing images of the object 301 includes an out-of-focus region. For example, when the focal plane of the image capturing apparatus 111 is adjusted to the focal surface FS1 illustrated in FIG. 3B, each end portion of the illumination image 303 is in focus. However, a blurred image is captured at the central portion of the illumination image 303 that is outside the depth of field of the image capturing apparatus 111. In contrast, when the focal plane of the image capturing apparatus 111 is adjusted to a focal surface FS2 illustrated in FIG. 3B, the central portion of the illumination image 303 is in focus. However, a blurred image is captured at each end portion of the illumination image 303 that is outside the depth of field of the image capturing apparatus 111.

GUI

Figure 4:
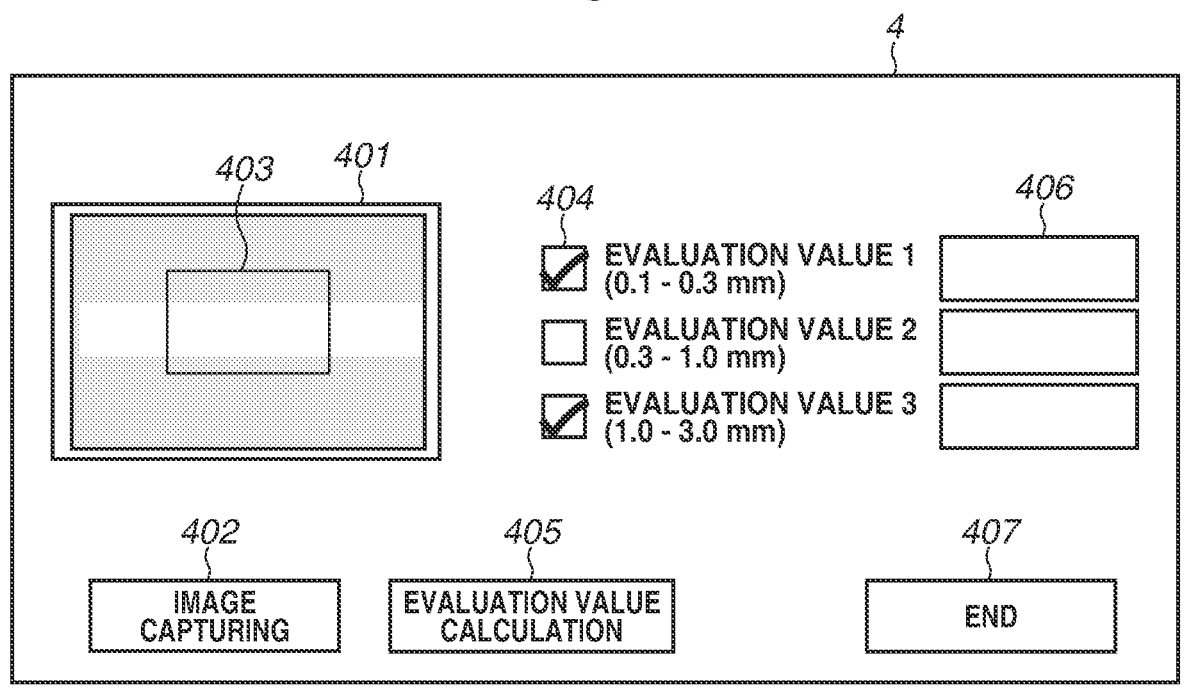
FIG. 4 illustrates an example of a graphical user interface (GUI).

FIG. 4 illustrates an example of a GUI 4 to be displayed on the display 115.

An image display window 401 is a window on which an image captured by the image capturing apparatus 111 is displayed. An image capturing button 402 is a button to be pressed by the user to transmit an image capturing instruction to the image capturing apparatus 111. The evaluation range designation region 403 is a rectangular region displayed as the evaluation range for evaluating orange peel in the image displayed on the image display window 401. The evaluation range designation region 403 can be arbitrarily designated by the user. The evaluation value-to-be-calculated designation boxes 404 are checkboxes for the user to designate the evaluation value to be calculated by checking any of the boxes. Specifically, the user checks the evaluation value-to-be-calculated designation boxes 404 to set the evaluation accuracy required for the cycle of the unevenness (wavelength of orange peel) on the surface of the object to be evaluated. In the example illustrated in FIG. 4, the user can select three evaluation values, i.e., an evaluation value "1" (0.1 mm to 0.3 mm), an evaluation value "2" (0.3 mm to 1.0 mm), and an evaluation value "3" (1.0 mm to 3.0 mm). An evaluation value calculation button 405 is a button to be pressed by the user to send an instruction to execute the evaluation value calculation processing on the evaluation range designated by checking the evaluation value-to-be-calculated designation boxes 404. Evaluation value display text boxes 406 are boxes on which the evaluation values calculated on the evaluation range designated by checking the evaluation value-to-be-calculated designation boxes 404 are displayed. An end button 407 is a button used for the user to send an instruction to end an image processing program (hereinafter referred to as an image processing application) according to the present exemplary embodiment.

Operation of Image Acquisition Unit

An operation of the image acquisition unit 151 under the geometric conditions illustrated in FIGS. 3A and 3B will now be described.

The image acquisition unit 151 acquires captured images from the image capturing apparatus 111 when the image capturing button 402 on the GUI 4 illustrated in FIG. 4 is pressed by the user.

The image acquisition unit 151 acquires a plurality of images obtained by the image capturing apparatus 111 capturing images of the object 301 on which the illumination image 303 is projected while shifting the focal position. At the time when the image capturing button 402 is pressed, the image capturing apparatus 111 is focused on the front surface (focal surface FS1) of the object 301 illustrated in FIG. 3B, for example. In the present exemplary embodiment, assume that the depth of the object 301 is about 150 mm and the depth of field of a lens is 80 mm, for example.

Accordingly, in this case, the image capturing apparatus 111 performs image capturing twice while shifting the focal surface by 80 mm in the depth direction each time with respect to the object 301.

The focal surface shifting range and the number of times of image capturing can be predetermined fixed values like in the first exemplary embodiment, or can be automatically set based on the geometric image capturing conditions or the like. A method for automatically setting the focal surface shifting range and the number of times of image capturing will be described below in a third exemplary embodiment. In the first exemplary embodiment, the image acquisition unit 151 acquires captured images using the image capturing apparatus 111 capturing images of the object 301 while shifting the focal position. However, the method is not limited to this example. The user can preliminarily store a plurality of images obtained by capturing images of the object 301 while operating the image capturing apparatus 111 shifting the focal position in the HDD 113, and the image acquisition unit 151 can acquire the captured images by reading the captured images from the HDD 113.

Figure 5:
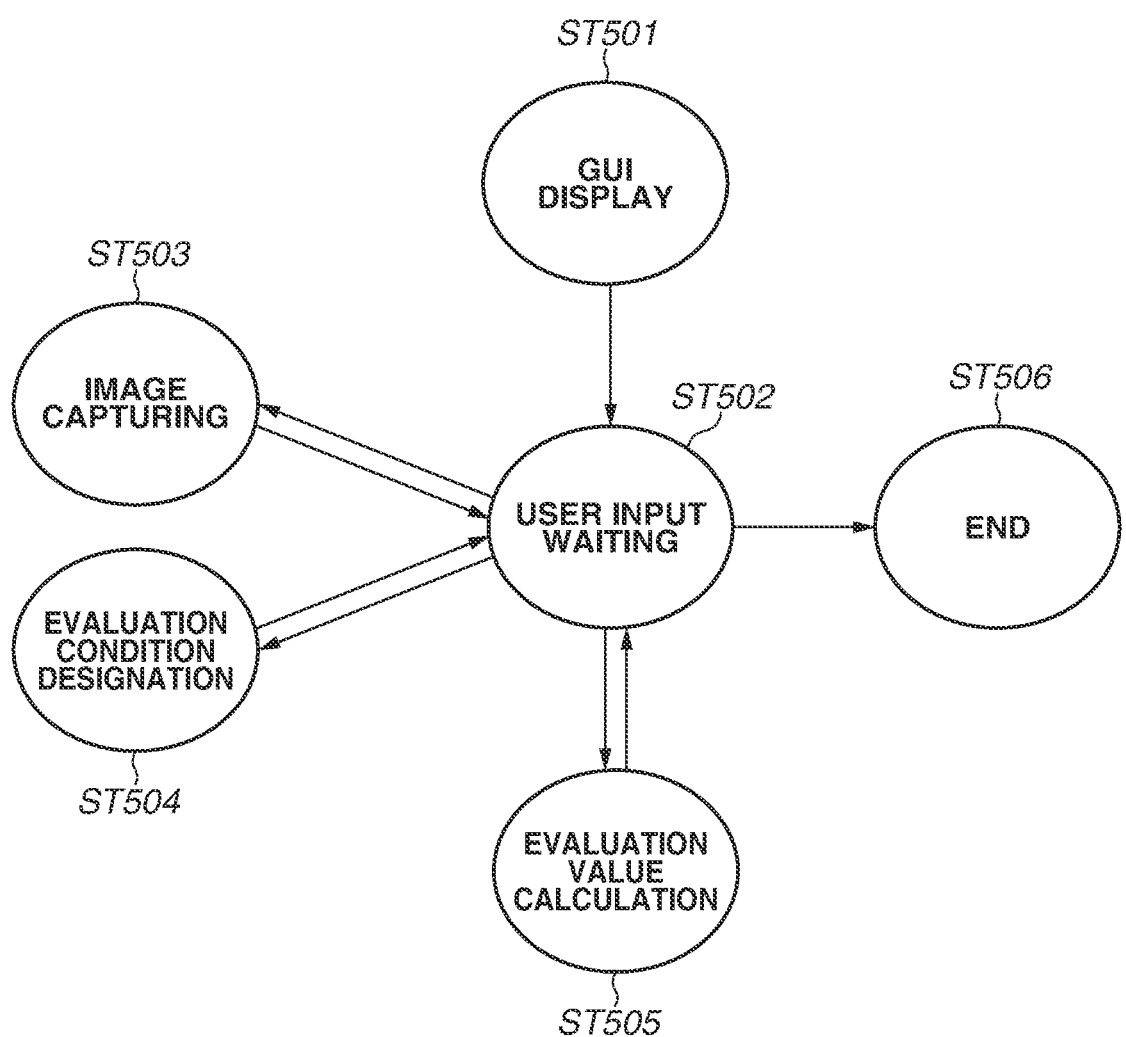
FIG. 5 illustrates a state transition on the GUI.

FIG. 5 illustrates a state transition of the image processing apparatus 1 in an example of the GUI according to the present exemplary embodiment.

When the image processing apparatus 1 executes the image processing application according to the present exemplary embodiment according to an instruction from the user, the image processing apparatus 1 is in state ST501. After displaying the above-described GUI, the image processing apparatus 1 transitions to state ST502. In state ST502, the image processing apparatus 1 waits for input from the user. In state ST502, for example, when the image capturing button 402 is pressed, the image processing apparatus 1 transitions to state ST503. In state ST502, when the user operates the evaluation range designation region 403 and the evaluation value-to-be-calculated designation boxes 404, the image processing apparatus 1 transitions to state ST504. In state ST502, when the evaluation value calculation button 405 is pressed, the image processing apparatus 1 transitions to state ST505. In state ST502, when the end button 407 is pressed, the image processing apparatus 1 transitions to state ST506.

In state ST503, the image processing apparatus 1 controls the image capturing apparatus 111 to capture images of the object to be evaluated, and displays the captured images on the image display window 401. The image processing apparatus 1 then transitions to state ST502.

In state ST504, when the evaluation range and the evaluation value to be calculated are designated as evaluation conditions according to an instruction from the user, the image processing apparatus 1 updates the display of each of the evaluation range designation region 403 and the evaluation value-to-be-calculated designation boxes 404. Thereafter, the image processing apparatus 1 transitions to state ST502.

In state ST505, the image processing apparatus 1 calculates the evaluation value and displays the evaluation value on the corresponding evaluation value display text box 406. The image processing apparatus 1 then transitions to state ST502.

In state ST506, the image processing apparatus 1 performs an operation to end the image processing application.

Figure 6A:
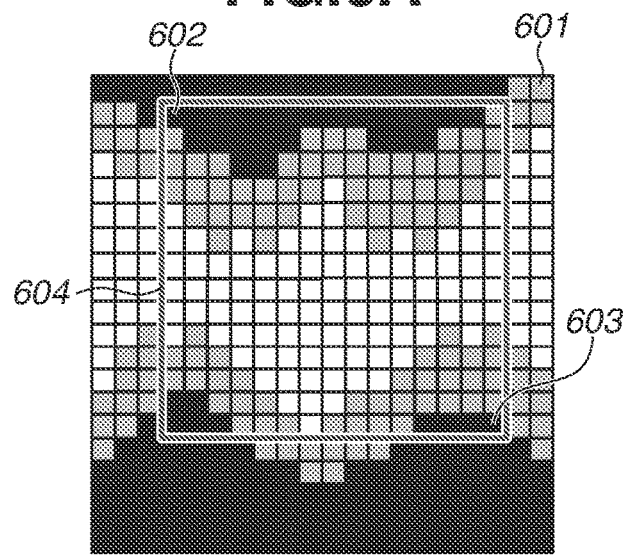
FIGS. 6A, 6B, 6C, and 6D each illustrate an example of an evaluation target range.

FIG. 6A schematically illustrates an evaluation target range 604 on an image 601 acquired in step S203. The evaluation target range 604 is set by receiving rectangular information on the evaluation range designation region 403 designated by the user on the image displayed on the image display window 401. Specifically, the image processing apparatus 1 receives coordinate values at a starting point 602 and an endpoint 603 of the rectangular region designated by the user, and sets the evaluation target range 604 in which the starting point 602 corresponds to the upper left pixel of the rectangular region and the endpoint 603 corresponds to the lower right pixel of the rectangular region. The starting point 602 and the endpoint 603 are designated by, for example, inputting coordinate values on the image through the input device 110. Thus, the image processing apparatus 1 according to the present exemplary embodiment uses the rectangular region (evaluation range designation region 403) designated by setting the starting point 602 and the endpoint 603 as the evaluation target range 604, and generates range designation data representing the evaluation target range 604.

Optical Profile Calculation Processing

Figure 7:
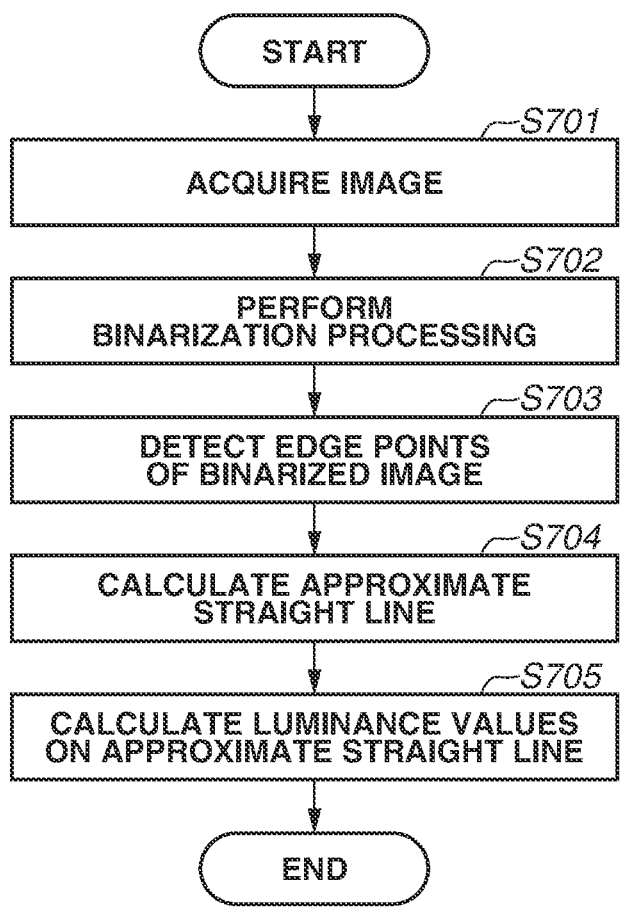
FIG. 7 is a flowchart illustrating optical profile calculation processing.

The optical profile calculation processing performed by the optical profile calculation unit 152 in step S204 will now be described with reference to the flowchart illustrated in FIG. 7. The optical profile calculation processing is applied to all captured images. Specifically, when four images are captured by shifting the focal position, optical profiles for the four images are calculated, so that four optical profiles are obtained.

In step S701, the optical profile calculation unit 152 acquires an image from the image acquisition unit 151.

Figure 6B:
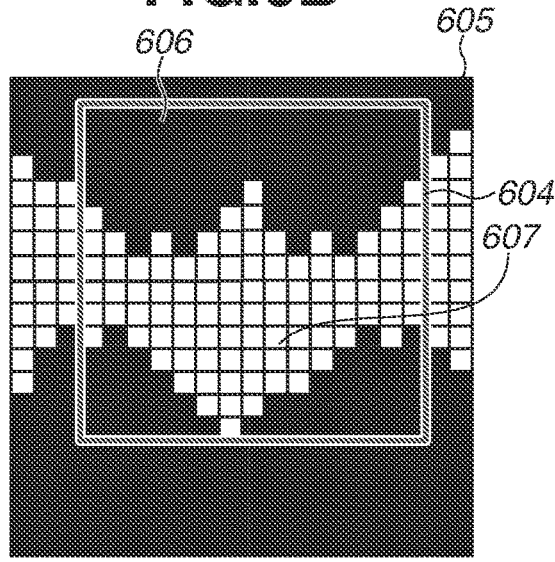

In step S702, the optical profile calculation unit 152 binarizes pixel values in the image using a predetermined binarization threshold. In the present exemplary embodiment, for example, an average luminance value is calculated for each pixel in the evaluation target range and the calculated average luminance value is used as the binarization threshold. The binarization processing in step S702 is processing in which when the pixel value is more than or equal to the threshold, the pixel value is set to "1" (black pixel), and when the pixel value is less than the threshold, the pixel value is set to "0" (white pixel). FIG. 6B illustrates an image 605 obtained after performing the binarization processing on the image 601 illustrated in FIG. 6A. The image 605 is composed of black pixels 606 with the pixel value "1" and white pixels 607 with the pixel value "0".

In step S703, the optical profile calculation unit 152 detects edges of the image 605 subjected to the binarization processing. Assume herein that coordinates (x, y) of the starting point 602 are represented by ($x_{st}$, $y_{st}$), and coordinates (x, y) of the endpoint 603 are represented by ($x_{ed}$, $y_{ed}$). Specifically, the optical profile calculation unit 152 searches the pixels with y-values $y_{st}$ to $y_{ed}$ corresponding to x-values $x_{st}$ to $x_{ed}$, respectively, and determines a pixel having a pixel value different from the pixel values of the adjacent pixels as a point (hereinafter referred to as an edge point) that forms an edge. The adjacent pixels are pixels that are adjacent in the y-direction. For example, the pixels that are adjacent to the pixel indicated by coordinates (X, Y) are the pixel indicated by coordinates (X, Y−1) and the pixel indicated by coordinates (X, Y+1). If there is a plurality of edge points for the same x-value, the optical profile calculation unit 152 determines one of the edge points at which the length of a straight line connecting the starting point and the endpoint is shorter than that at the other of the edge points to be the edge point. Thus, the edges formed by the edge points can be detected.

In step S704, the optical profile calculation unit 152 acquires luminance information on an approximate straight line obtained by approximating the edges (set of edge points) detected in step S703 by a linear function. In the present exemplary embodiment, the approximate straight line is calculated by the known least-square method.

In step S705, the optical profile calculation unit 152 calculates the luminance value at each pixel position on the approximate straight line calculated in step S704 as the optical profile (luminance profile).

Figure 6C:
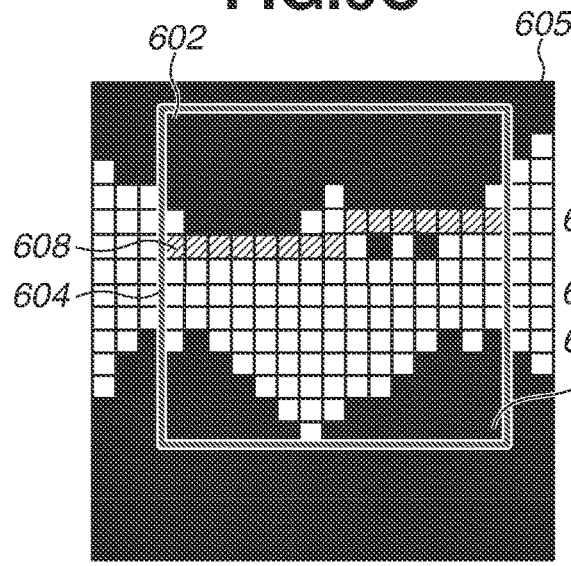

FIG. 6C schematically illustrates an example of the approximate straight line calculated by the optical profile calculation unit 152. A line segment composed of pixels indicated by a shaded area in FIG. 6C represents an approximate line 608.

Optical Profile Combining Processing

Figure 8:
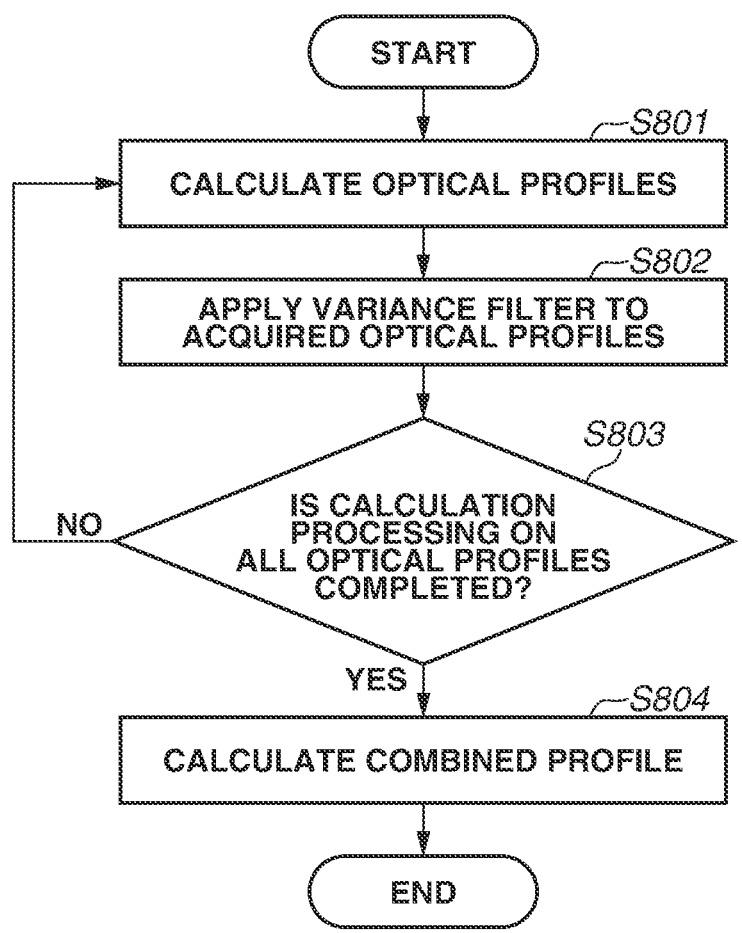
FIG. 8 is a flowchart illustrating optical profile combining processing.

The optical profile combining processing performed by the combining unit 153 in step S205 will now be described with reference to the flowchart illustrated in FIG. 8.

In step S801, the combining unit 153 acquires optical profiles $P_m$ that are calculated for each image in step S204. In the optical profiles $P_m$, "m" represents the index of the profile calculated by the optical profile calculation unit 152. When the number of profiles calculated in step S204 is M, $0 \leq m \leq M-1$ holds.

In step S802, the combining unit 153 calculates contrast information depending on the optical profiles by applying a predetermined variance filter as represented by the following formulas (1) and (2) to each of the optical profiles acquired in step S801. In formulas (1) and (2), "w" represents a window width with which a variance value is calculated. In the present exemplary embodiment, w=2.

$$V_m(x) = \frac{1}{2w+1} \sum_{i=x-w}^{i=x+w} (P_m(i) - \overline{P_m(x)})^2, \quad (1)$$

where $\overline{P_m(x)}$ represents the average value of P(x) in the range of $x-w \leq i \leq x+w$.

$$\overline{P_m(x)} = \frac{1}{2w+1} \sum_{i=x-w}^{i=x+w} P_m(i). \quad (2)$$

In step S803, the combining unit 153 determines whether the processing of steps S801 and S802 on all optical profiles is completed. If the combining unit 153 determines that the processing on all optical profiles is completed (YES in step S803), the processing proceeds to step S804. If the combining unit 153 determines that the processing on all optical profiles is not completed (NO in step S803), the processing returns to step S801.

In step S804, the combining unit 153 calculates a combined profile P based on the plurality of optical profiles $P_m$. In the present exemplary embodiment, the value of each optical profile at which a variance value $V_m$ calculated in formula (1) based on the plurality of optical profiles $P_m$ is maximum is adopted for each pixel position, thereby calculating the combined profile P. That is, in step S804, the combining unit 153 calculates the combined profile P by adopting the value of each optical profile at which the contrast information calculated in step S802 is maximum for each pixel position. Specifically, the processing in step S804 is given by the following formulas (3) and (4).

$$P(x) = P_{\hat{m}_x}(x). \tag{3}$$

$$\hat{m}_x = \underset{m}{\mathrm{argmax}} V_m(x). \tag{4}$$

The optical profile combining processing operation will now be described in detail with reference to schematic graphs illustrated in FIGS. 9A to 9E.

Figure 9A:
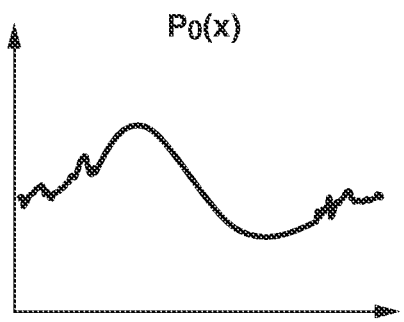
FIGS. 9A, 9B, 9C, 9D, and 9E are schematic graphs each illustrating an example of optical profile combining processing.
Figure 9B:
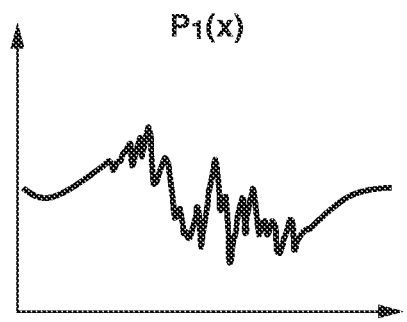

FIGS. 9A and 9B are schematic graphs each illustrating example of the optical profiles $P_m$ acquired in step S801. An optical profile $P_0(x)$ illustrated in FIG. 9A is calculated based on the image corresponding to the portion of the illumination image 303 when the image of the object 301 is captured on the focal surface FS1 illustrated in FIG. 3B.

If the image of the object 301 is captured on the focal surface FS1 illustrated in FIG. 3B, each end portion of the illumination image 303 is in focus. In this case, the optical profile is acquired as a fine luminance change at each end portion, while the optical profile is acquired as a smooth luminance change at the central portion where the image is blurred. In contrast, an optical profile $P_1(x)$ illustrated in FIG. 9B is calculated based on the image corresponding to the portion of the illumination image 303 when the image of the object 301 is captured on the focal surface FS2 illustrated in FIG. 3B. If the image of the object 301 is captured on the focal surface FS2 illustrated in FIG. 3B, the central portion of the illumination image 303 is in focus. In this case, while the optical profile is acquired as a fine luminance change at the central portion, the optical profile is acquired as a smooth luminance change at each end portion.

Figure 9C:
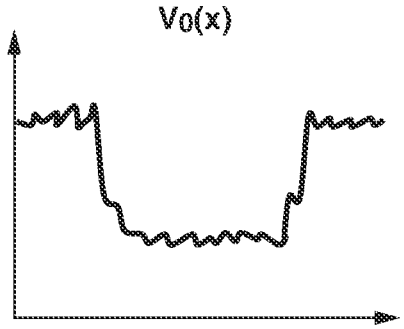
Figure 9D:
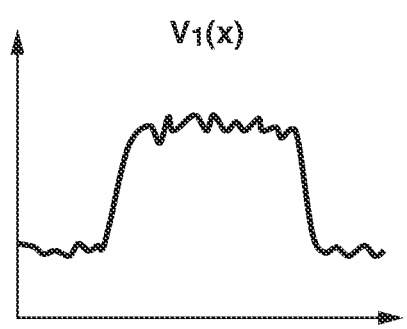

FIG. 9C is a schematic graph illustrating a result $V_0(x)$ obtained by applying the variance filter to the optical profile $P_0(x)$ illustrated in FIG. 9A in step S802, that is, the state of change in contrast. Similarly, FIG. 9D is a schematic graph illustrating a result $V_1(x)$ obtained by applying the variance filter to the optical profile $P_1(x)$ illustrated in FIG. 9B in step S802, that is, the state of change in contrast. The variance value to be calculated in the in-focus region of the optical profile is a large value. Accordingly, the variance filter application result $V_0(x)$ for the optical profile $P_0(x)$ illustrated in FIG. 9A takes a larger value at a location closer to each end portion and takes a smaller value at a location closer to the central portion. In contrast, the variance filter application result $V_1(x)$ for the optical profile $P_1(x)$ illustrated in FIG. 9B has an opposite trend and takes a smaller value at a location closer to each end portion and takes a larger value at a location closer to the central portion.

Figure 9E:
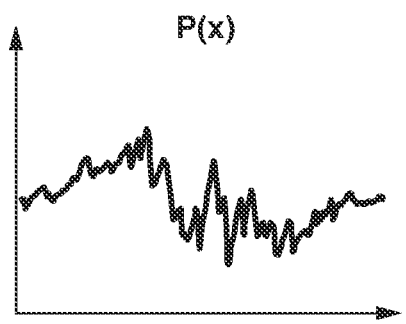

FIG. 9E is a schematic graph illustrating an example of the combined profile P(x) calculated in step S804.

In step S804, one of the optical profiles $P_0(x)$ and $P_1(x)$ at which a larger variance value is obtained is adopted to generate the combined profile P(x). Accordingly, the combined profile P(x) is calculated as the corresponding optical profile when the entire region is in focus.

Figure 6D:
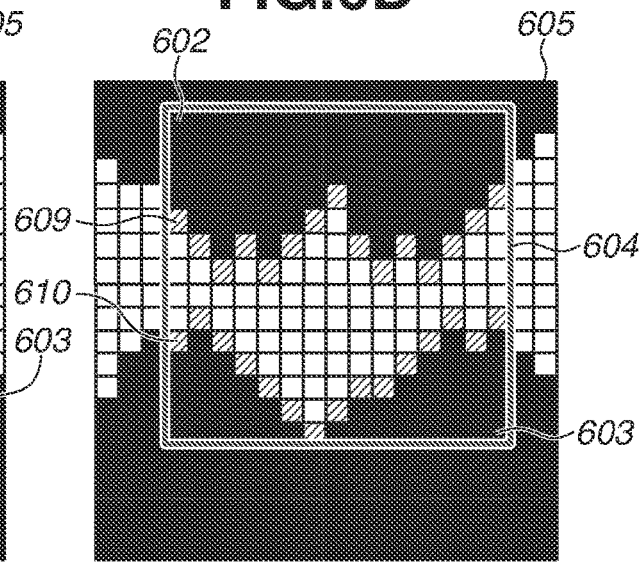

FIG. 6D schematically illustrates the combined profile obtained after the combining processing is performed by the combining unit 153. Portions 609 and 610 each composed of a pixel indicated by a shaded area in FIG. 6D correspond to the combined profile.

In the present exemplary embodiment, the combined profile is generated based on the variance value for each optical profile. However, profile combining is not limited to this example. For example, the optical profiles can be combined based on a contrast ratio or a power spectrum of Fourier transform, instead of using the variance value. In the present exemplary embodiment, the optical profiles are combined for each pixel. However, profile combining is not limited to this example. For example, the variance filter can be provided with a step width, and the combined profile can be generated by determining which one of optical profiles is adopted for each region (e.g., every 10 pixels).

Evaluation Value Calculation Processing

Figure 10:
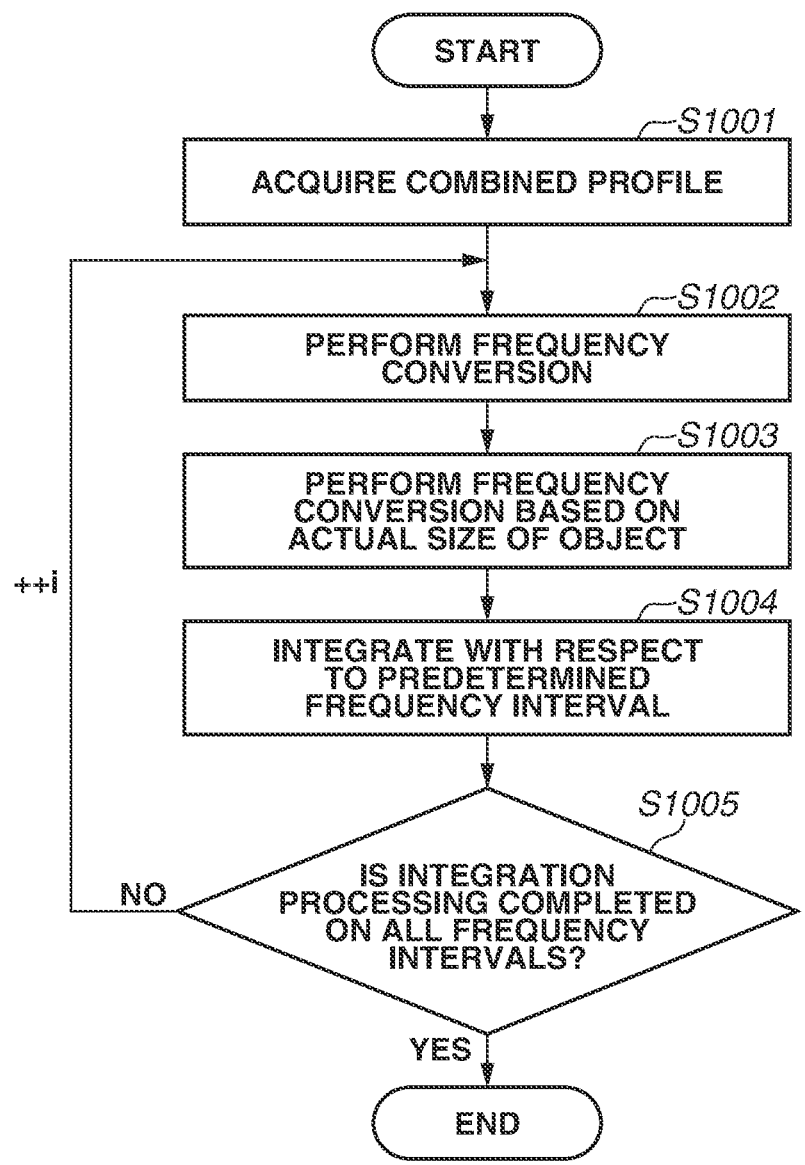
FIG. 10 is a flowchart illustrating evaluation value calculation processing.

The evaluation value calculation processing performed by the evaluation value calculation unit 154 in step S206 will now be described with reference to the flowchart illustrated in FIG. 10.

In step S1001, the evaluation value calculation unit 154 acquires the combined profile calculated in step S205.

In step S1002, the evaluation value calculation unit 154 performs frequency conversion on the combined profile.

In step S1003, the evaluation value calculation unit 154 performs frequency conversion corresponding to the actual size of the object by using the following formula (5) based on sampling intervals after conversion and the actual size of the object per unit interval after conversion. In formula (5), the frequency obtained before conversion is represented by $f_{pix}$ and the frequency corresponding to the actual size of the object after conversion is represented by $f_{mm}$.

$$f_{mm}(i) = \frac{s_r}{f_{pix}(i)}. \tag{5}$$

In step S1004, the evaluation value calculation unit 154 integrates with respect to a predetermined frequency interval and calculates an evaluation value. When the evaluation value is represented by $P_{eva}$, the amplitude of the frequency is represented by amp, the lower-limit frequency in the integration interval is represented by f1, and the upper-limit frequency in the integration interval is represented by f2, the following formula (6) can be obtained.

$$P_{eva} = \Sigma_{f1}^{f2} \mathrm{amp} \tag{6}$$

As an example of the predetermined frequency interval, when the evaluation value is "1", the frequencies corresponding to the actual size of the object, such as f1=0.1 cycle/mm and f2=0.3 cycle/mm, can be used, for example. The interval can be set by designating any frequencies, and a plurality of intervals can also be set.

In step S1005, the evaluation value calculation unit 154 determines whether integration processing on all frequency intervals is completed. If the integration processing on all frequency intervals is not completed (NO in step S1005), the processing returns to step S1002. If the integration processing on all frequency intervals is completed (YES in step S1005), the processing ends.

As described above, the image processing apparatus 1 according to the first exemplary embodiment calculates optical profiles based on a plurality of images obtained by capturing images of the object surface while shifting the focal position. Further, the image processing apparatus 1 generates a combined profile by combining the plurality of optical profiles calculated for each image using the optical profile portions in in-focus regions respectively corresponding to the focal positions. For example, the image processing apparatus 1 calculates contrast information for the plurality of optical profiles, and combines the plurality of optical profiles using the regions corresponding to the portions where the calculated contrast information is maximum, thereby generating the combined profile. Thereafter, the image processing apparatus 1 according to the present exemplary embodiment calculates an orange peel evaluation value using the combined profile, thereby making it possible to calculate the orange peel evaluation value even when the shape of the object has a depth that exceeds the depth of field of the image capturing apparatus 111. Specifically, the image processing apparatus 1 according to the first exemplary embodiment can calculate the accurate orange peel evaluation value for any object surface even when the object surface has a curved structure in the depth direction.

The image processing apparatus 1 according to the first exemplary embodiment acquires a plurality of images by capturing images of the object while shifting the focal position, calculates a plurality of optical profiles based on the images, and combines the plurality of optical profiles, to thereby calculate an accurate orange peel evaluation value also for an object surface having a depth. However, it takes time and labor to perform the processing of capturing a plurality of images of the object surface while shifting the focal position.

The image processing apparatus 1 according to a second exemplary embodiment determines whether there is a need to combine optical profiles depending on the wavelength of orange peel to be evaluated. Specifically, the image processing apparatus 1 according to the second exemplary embodiment determines whether there is a need to combine optical profiles depending on the evaluation accuracy required for the cycle of the unevenness on the surface of the object to be evaluated. In other words, in the present exemplary embodiment, whether there is a need to combine optical profiles indicates whether to acquire a plurality of images by capturing images of the object while shifting the focal position and to calculate optical profiles based on the captured images. In the present exemplary embodiment, when it is determined that there is a need to combine optical profiles, a plurality of images of the subject is captured while the focal position is shifted. In contrast, when it is determined that there is no need to combine optical profiles, the orange peel evaluation value is calculated based on the optical profile acquired based on one captured image. Only differences between the image processing apparatus 1 according to the second exemplary embodiment and the image processing apparatus 1 according to the first exemplary embodiment will be described below.

Figure 11:
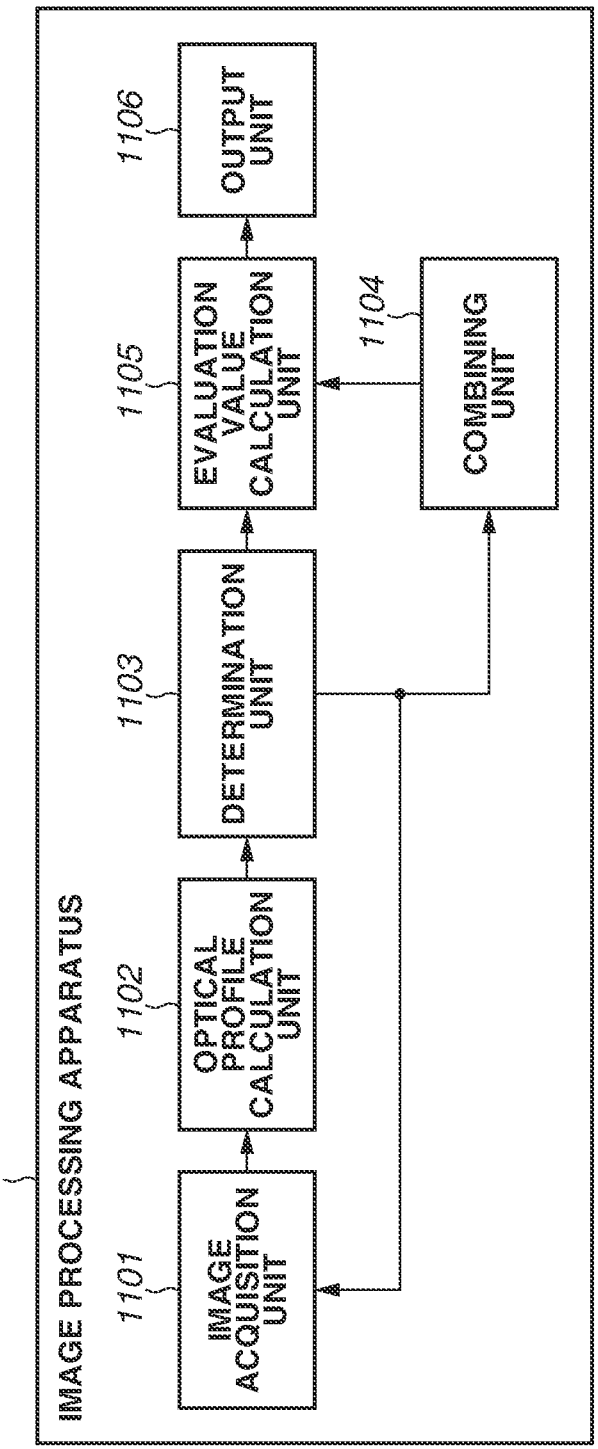
FIG. 11 is a block diagram illustrating a functional configuration example of an image processing apparatus according to a second exemplary embodiment.

Functional Configuration of Image Processing Apparatus According to Second Exemplary Embodiment FIG. 11 is a block diagram illustrating a functional configuration example of the image processing apparatus 1 according to the second exemplary embodiment.

The image processing apparatus 1 according to the second exemplary embodiment includes an image acquisition unit 1101, an optical profile calculation unit 1102, a determination unit 1103, a combining unit 1104, an evaluation value calculation unit 1105, and an output unit 1106. The image acquisition unit 1101 acquires a captured image of the object to be evaluated. The optical profile calculation unit 1102 calculates optical profiles based on the image acquired by the image acquisition unit 1101. The determination unit 1103 determines whether there is a need to combine the optical profiles calculated by the optical profile calculation unit 1102.

If the determination unit 1103 determines that there is a need to combine the optical profiles, the image acquisition unit 1101 acquires a plurality of images captured while shifting the focal position. The optical profile calculation unit 1102 then calculates optical profiles based on the plurality of images. The combining unit 1104 acquires the plurality of optical profiles from the optical profile calculation unit 1102 and integrates the plurality of optical profiles, to thereby calculate one combined profile. In contrast, if the determination unit 1103 determines that there is no need to combine the optical profiles, the image acquisition unit 1101 acquires one captured image without shifting the focal position, and the optical profile calculation unit 1102 calculates an optical profile based on the image.

If the combined profile is calculated, the evaluation value calculation unit 1105 calculates the evaluation value based on the combined profile. If the combined profile is not calculated, the evaluation value calculation unit 1105 calculates the evaluation value based on the optical profile calculated based on one image. The output unit 1106 outputs the evaluation value calculated by the evaluation value calculation unit 1105.

Figure 12:
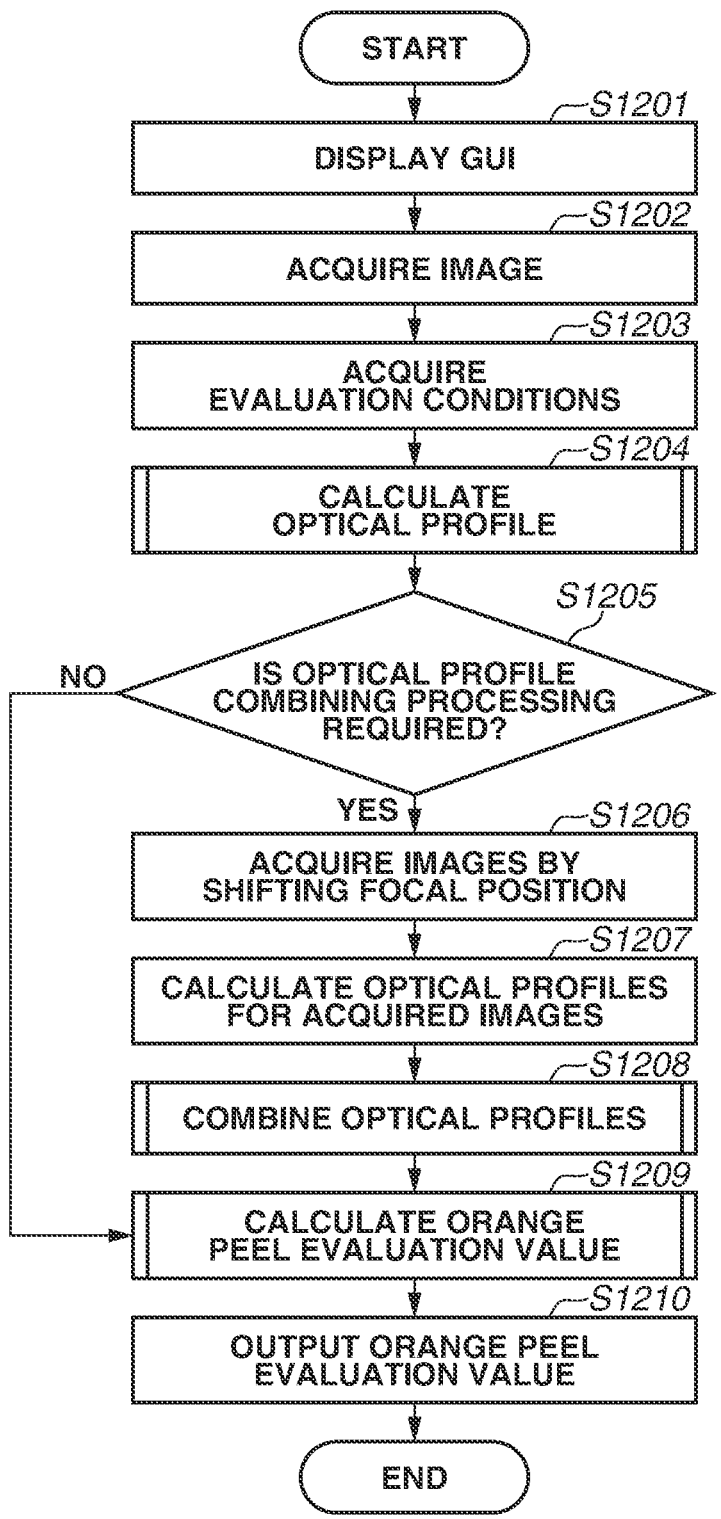
FIG. 12 is a flowchart illustrating image processing to be performed by the image processing apparatus according to the second exemplary embodiment.

Image Processing Performed by Image Processing Apparatus According to Second Exemplary Embodiment FIG. 12 is a flowchart illustrating an image processing flow to be performed by the image processing apparatus 1 according to the second exemplary embodiment.

In step S1201, the CPU 101 of the image processing apparatus 1 executes a program (image processing application) according to the second exemplary embodiment stored in the HDD 113, thereby displaying the GUI 4 illustrated in FIG. 4 on the display 115. The processing in step S1201 is similar to the processing of step S201 according to the first exemplary embodiment.

In step S1202, the image acquisition unit 1101 acquires images of the object to be evaluated that are captured by the image capturing apparatus 111 in accordance with the settings made by the user through the above-described GUI. According to the second exemplary embodiment, in step S1202, the image acquisition unit 1101 acquires one captured image without shifting the focal position, unlike in step S202 according to the first exemplary embodiment.

In step S1203, the optical profile calculation unit 1102 and the evaluation value calculation unit 1105 acquire evaluation conditions set by the user via the GUI illustrated in FIG. 4. The processing in step S1203 is similar to the processing in step S203 according to the first exemplary embodiment. The evaluation target range designated by the user and the conditions for the evaluation value are acquired via the above-described GUI.

In step S1204, the optical profile calculation unit 1102 calculates the optical profile. The processing in step S1204 is similar to the processing in step S204 according to the first exemplary embodiment. However, each optical profile in this case is calculated based on the one image acquired in step S1202.

In step S1205, the determination unit 1103 determines whether there is a need to combine optical profiles. The determination processing in the determination unit 1103 will be described in detail below. If it is determined that there is a need to combine optical profiles (YES in step S1205), the processing proceeds to step S1206. If it is determined that there is no need to combine optical profiles (NO in step S1205), the processing proceeds to step S1209.

In step S1206, the image acquisition unit 1101 acquires a plurality of images captured while shifting the focal position in the same manner as in the first exemplary embodiment described above.

In step S1207, the optical profile calculation unit 1102 calculates optical profiles for the plurality of images acquired in step S1206 in the same manner as in the first exemplary embodiment.

In step S1208, the combining unit 1104 combines the optical profile acquired in step S1204 and the plurality of optical profiles acquired in step S1207. The optical profile combining processing in step S1208 is similar to the processing in step S205 according to the first exemplary embodiment.

In step S1209, the evaluation value calculation unit 1105 calculates the orange peel evaluation value using the optical profile calculated in step S1204 in the case where the evaluation value calculation unit 1105 has determined that there is no need to combine optical profiles in step S1205. In the case where the evaluation value calculation unit 1105 has determined that there is a need to combine optical profiles in step S1205, the evaluation value calculation unit 1105 calculates the orange peel evaluation value using the combined profile calculated in step S1208. The evaluation value calculation processing in step S1209 is similar to the processing in step S206 according to the first exemplary embodiment.

In step S1210, the output unit 1107 outputs the evaluation value to the display 115. The evaluation value output processing in step S1210 is similar to the processing in step S207 according to the first exemplary embodiment.

Optical Profile Combining Determination Processing

Figure 13:
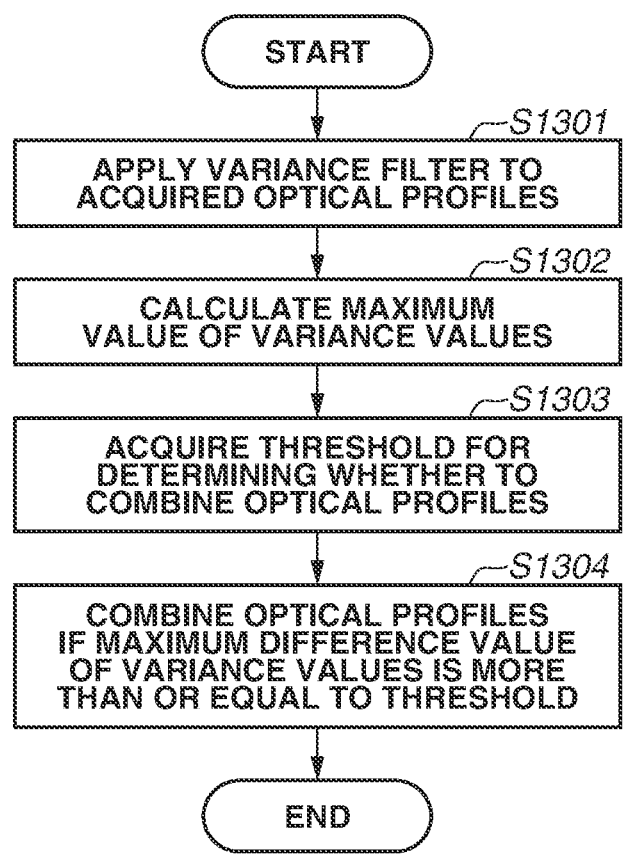
FIG. 13 is a flowchart illustrating combining determination processing according to the second exemplary embodiment.

The optical profile combining determination processing performed by the determination unit 1103 in step S1205 will now be described with reference to the flowchart illustrated in FIG. 13.

In step S1301, the determination unit 1103 applies the variance filter to the optical profile $P_0$ calculated in step S1204 to acquire the variance filter application result $V_0$. The variance filter application processing in step S1301 is similar to the processing in step S802 according to the first exemplary embodiment.

In step S1302, the determination unit 1103 calculates a maximum difference between variance values, i.e., a maximum difference in contrast information, on the variance filter application result $V_0$ obtained in step S1301. Specifically, the processing in step S1302 is given by the following formula (7).

$$\mathrm{max} Diff = \max_x V_0(x) - \min_x V_0(x). \quad (7)$$

Figure 14:
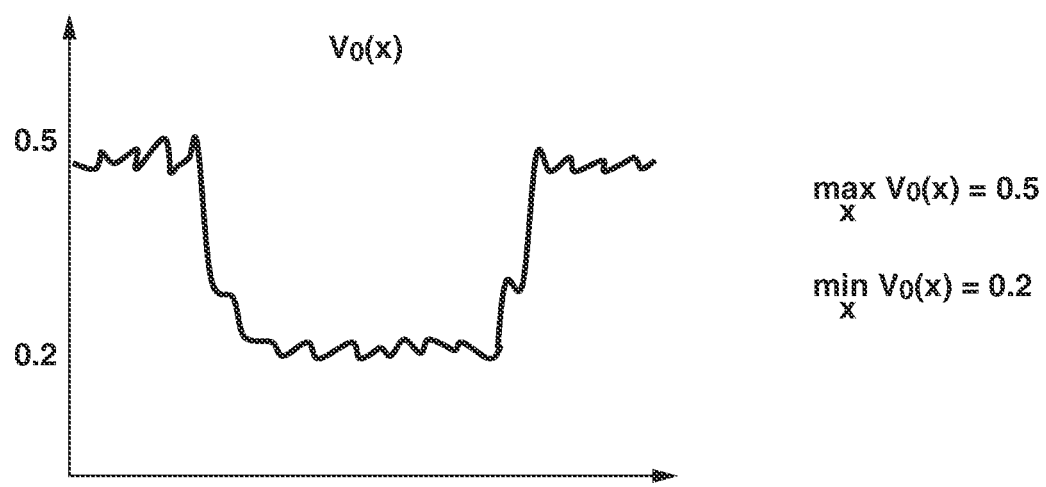
FIG. 14 is a schematic graph illustrating an example of a maximum difference between variance values for optical profile combining determination processing.

FIG. 14 is a schematic graph illustrating the processing operation in step S1302.

As described above in the first exemplary embodiment, in the optical profile $P_0$, an in-focus region shows a high variance value and an out-of-focus region shows a low variance value. In the variance filter application result $V_0(x)$ for the optical profile illustrated in FIG. 14, the maximum value is 0.5 and the minimum value is 0.2. According to formula (7), maxDiff=0.5−0.2=0.3 is calculated as the maximum difference between the variance values. The value calculated by formula (7) indicates the degree of variation in the variance value on the entire optical profile, and indicates the degree of defocus in the optical profile.

In step S1303, the determination unit 1103 acquires information about a predetermined determination threshold from the HDD 113 so as to determine whether to combine optical profiles.

FIG. 15 is a table illustrating examples of the determination threshold stored in the HDD 113. In the present exemplary embodiment, different determination thresholds are set for the respective orange peel evaluation values to be calculated as illustrated in FIG. 15. For example, in the case of evaluating orange peel with a short wavelength, like in the case of the evaluation value "1" (wavelength of 0.1 to 0.3 mm), the state of defocus has a great influence on the evaluation value. Thus, a small value is set as the determination threshold for the evaluation value "1" so that optical profiles can be combined if even a slight defocus state is observed. In contrast, in the case of evaluating orange peel with a long wavelength (low frequency), like in the case of the evaluation value "3" (wavelength of 1.0 to 3.0 mm), the defocus state has little influence on the evaluation value even if a defocus state is observed. Accordingly, a great value is set as the determination threshold for the evaluation value "3". In other words, in the present exemplary embodiment, the threshold for determining whether there is a need to combine optical profiles can be set depending on the evaluation accuracy required for the cycle of the unevenness (wavelength of orange peel) on the surface of the object to be evaluated.

If a plurality of evaluation values is designated as the calculation target in step S1203 illustrated in FIG. 12, the minimum determination threshold corresponding to the evaluation value to be calculated is used as the determination threshold acquired in step S1303. For example, the determination threshold acquired in step S1303 is 0.1 when the evaluation value "1" and the evaluation value "3" are checked as the calculation targets in the example of the GUI 4 illustrated in FIG. 4.

In step S1304, the determination unit 1103 compares the maximum difference maxDiff calculated as described above with the determination threshold. If the maximum difference maxDiff is more than or equal to the threshold, the determination unit 1103 determines that there is a need to combine optical profiles. If the maximum difference maxDiff is less than the threshold, the determination unit 1103 determines that there is no need to combine optical profiles.

As described above, the image processing apparatus 1 according to the second exemplary embodiment determines the necessity for combining optical profiles based on the variance value calculated based on the optical profiles acquired based on one captured image and the orange peel evaluation value to be calculated. Only when it is determined that there is a need to combine optical profiles, a plurality of images of the object to be evaluated is captured while the focal position is shifted. In contrast, if it is determined that there is no need to combine optical profiles, the orange peel evaluation value is calculated based on the optical profiles obtained based on one captured image. According to the second exemplary embodiment, the number of times of image capturing while shifting the focal position can be reduced. Consequently, it is possible to accurately evaluate orange peel on an object surface having a depth with a small burden on the user.

In the second exemplary embodiment, it is determined whether there is a need to combine optical profiles after the image of the object to be evaluated is captured once. In this case, if three-dimensional information using design information, such as computer-aided design (CAD) data, about the object to be evaluated can be used, the necessity for combining optical profiles is determined before capturing the image of the object to be evaluated. In the third exemplary embodiment, a method for calculating depth information about the object to be evaluated based on three-dimensional information, such as CAD data about the object, determining the necessity for combining optical profiles based on the depth information, and evaluating orange peel will be described. In the third exemplary embodiment as described above, whether there is a need to combine optical profiles indicates whether to acquire a plurality of images by capturing images of the object while shifting the focal position and to calculate optical profiles based on the captured images.

Only differences between the image processing apparatus 1 according to the third exemplary embodiment and the image processing apparatus 1 according to the second exemplary embodiment described above will now be described.

Figure 16:
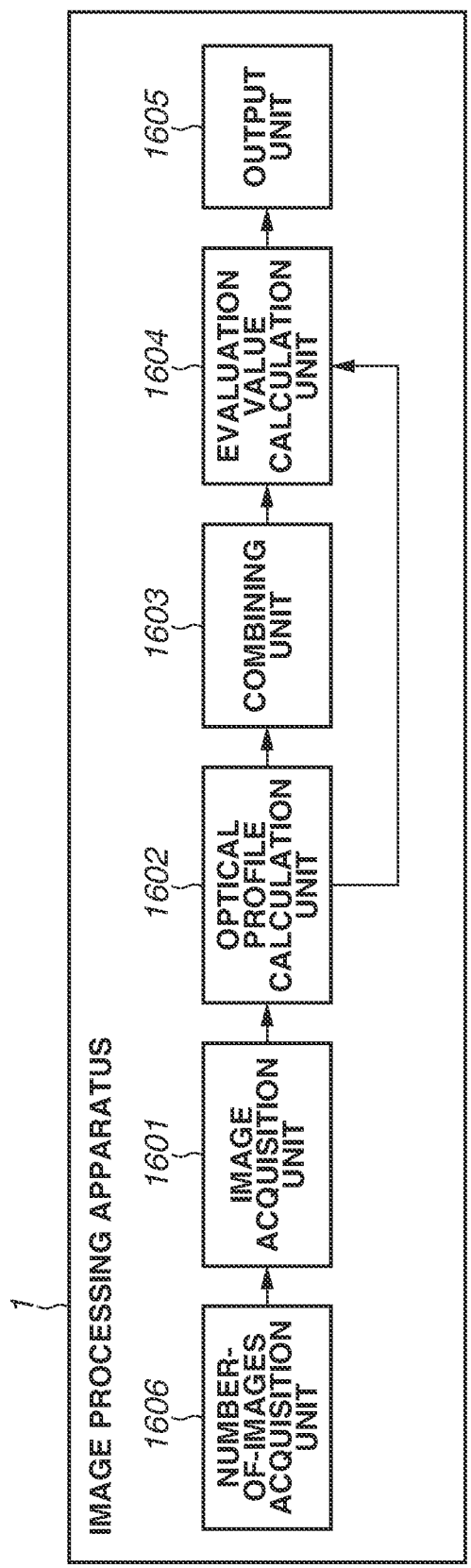
FIG. 16 is a block diagram illustrating a functional configuration example of an image processing apparatus according to a third exemplary embodiment.

Functional Configuration of Image Processing Apparatus According to Third Exemplary Embodiment FIG. 16 is a block diagram illustrating a functional configuration of the image processing apparatus 1 according to the third exemplary embodiment.

The image processing apparatus 1 according to the third exemplary embodiment includes an image acquisition unit 1601, an optical profile calculation unit 1602, a combining unit 1603, an evaluation value calculation unit 1604, an output unit 1605, and a number-of-images acquisition unit 1606.

The number-of-images acquisition unit 1606 calculates the number of images to be captured for optical profile combining processing using depth information obtained from three-dimensional information, such as CAD data. The image acquisition unit 1601 acquires images obtained by capturing images of the object to be evaluated by changing the focal position based on the number of images to be captured calculated by the number-of-images acquisition unit 1606. Specifically, if the number of images to be captured calculated by the number-of-images acquisition unit 1606 is one, the image acquisition unit 1601 acquires one image obtained by capturing the image of the object to be evaluated without changing the focal position. In contrast, if the number of images to be captured calculated by the number-of-images acquisition unit 1606 is two or more, the image acquisition unit 1601 acquires a plurality of images obtained by capturing images of the object to be evaluated while changing the focal position.

The optical profile calculation unit 1602 calculates each optical profile based on the images acquired by the image acquisition unit 1601. If only one image is acquired by the image acquisition unit 1601, the optical profile calculation unit 1602 calculates each optical profile based on the one image. If a plurality of images is acquired by the image acquisition unit 1601, the optical profile calculation unit 1602 calculates optical profiles for each image.

When the optical profile calculation unit 1602 calculates a plurality of optical profiles, the combining unit 1603 combines the plurality of optical profiles to calculate a combined profile. Further, when the combining unit 1603 calculates the combined profile, the evaluation value calculation unit 1604 calculates the orange peel evaluation value using the combined profile. In contrast, if the optical profile calculation unit 162 calculates each optical profile based on only one image, the evaluation value calculation unit 1604 calculates the orange peel evaluation value using the calculated optical profile. The output unit 1605 outputs the evaluation value calculated by the evaluation value calculation unit 1604.

GUI Used in Third Exemplary Embodiment

The GUI used in the third exemplary embodiment is similar to the GUI used in the first exemplary embodiment, except for the image display window 401 illustrated in FIG. 4 described above. While the captured image is displayed on the image display window 401 in the first exemplary embodiment, depth information about the object to be evaluated that is to be captured is also displayed as the image on the image display window 401 in the third exemplary embodiment. Accordingly, the user designates the evaluation range by operating the evaluation range designation region 403 while viewing the depth image before image capturing.

Image Processing According to Third Exemplary Embodiment

Figure 17:
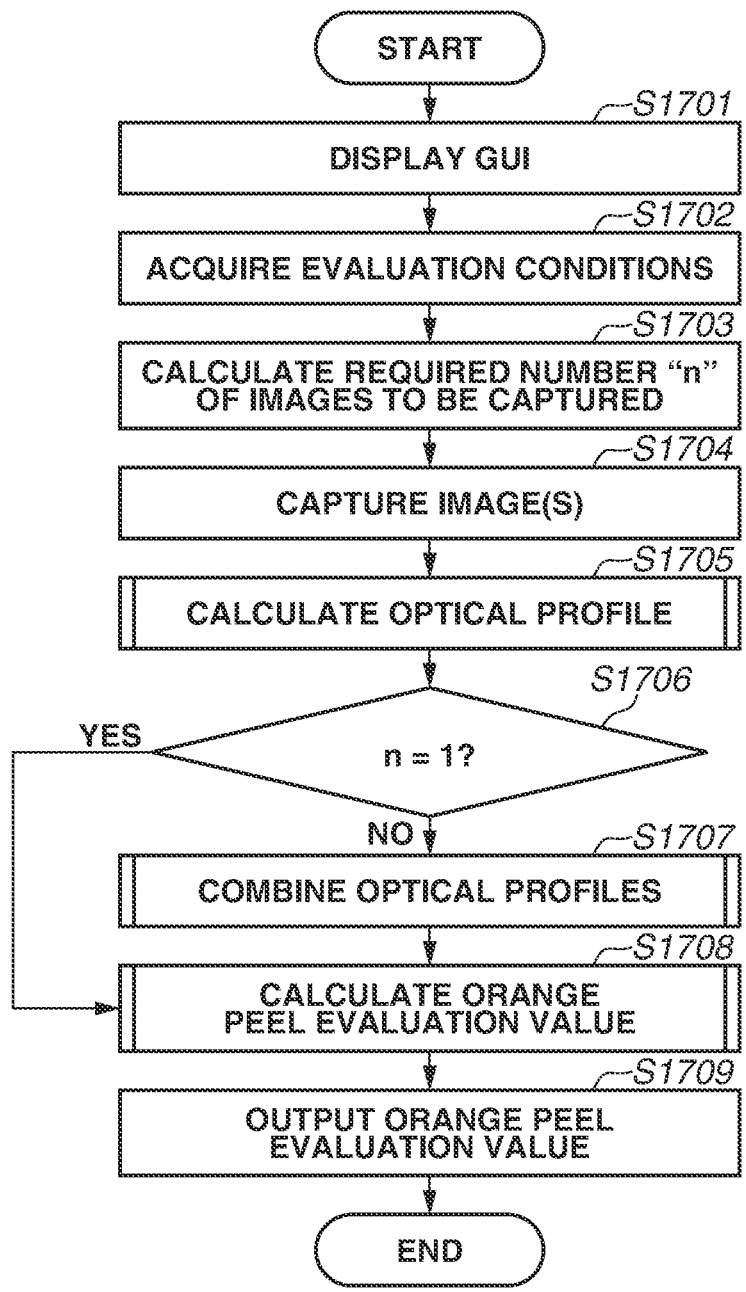
FIG. 17 is a flowchart illustrating image processing to be performed by the image processing apparatus according to the third exemplary embodiment.

FIG. 17 is a flowchart illustrating a processing flow to be performed by the image processing apparatus 1 according to the third exemplary embodiment.

In step S1701, the CPU 101 of the image processing apparatus 1 executes a program (image processing application) according to the third exemplary embodiment stored in the HDD 113, thereby displaying the GUI illustrated in FIG. 4 on the display 115. In the third exemplary embodiment, the depth information about the object to be evaluated is calculated based on CAD data and the depth information about the object is also displayed on the image display window 401.

In step S1702, the optical profile calculation unit 1102 and the evaluation value calculation unit 1105 acquire evaluation conditions set by the user via the GUI 4 illustrated in FIG. 4. The processing of step S1702 is similar to the processing in step S203 according to the first exemplary embodiment. The evaluation target range designated by the user and the conditions for the evaluation value are acquired via the above-described GUI.

In step S1703, the number-of-images acquisition unit 1606 calculates the number (hereinafter referred to as the required number "n" of images to be captured) of optical profiles to be used for calculating the orange peel evaluation value based on the depth information. The processing for acquiring the required number "n" of images to be captured in step S1703 will be described in detail below.

In step S1704, the image acquisition unit 1601 acquires the captured image of the object to be evaluated. In this case, if the required number "n" of images to be captured calculated by the number-of-images acquisition unit 1606 is one (n=1), the image capturing apparatus 111 captures the image of the object without shifting the focal position. Accordingly, in this case, the image acquisition unit 1601 acquires one captured image. If the required number "n" of images to be captured is not "1" (n is 2 or more), the image capturing apparatus 111 captures images of the object while shifting the focal position. Accordingly, in this case, the image acquisition unit 1601 acquires a plurality of images (n images) captured by shifting the focal position. The method of acquiring one captured image of the object is similar to the image capturing method in step S1201 according to the second exemplary embodiment, and the method of acquiring n captured images of the object is similar to the image capturing method in step S1206.

In step S1705, the optical profile calculation unit 1602 calculates each optical file based on the image acquired in step S1705. In the third exemplary embodiment, the optical profile calculation unit 1602 performs alignment processing based on the captured image and the depth information, and calculates each optical profile using an image region in the evaluation range designation region (evaluation target range) designated by the user based on the depth information on the GUI in step S1702. The optical profile calculation processing is similar to the processing in step S1205 according to the second exemplary embodiment.

In step S1706, the optical profile calculation unit 1602 determines whether the required number "n" of images to be captured calculated in step S1703 is one (n=1). If it is determined that n=1 holds, the processing proceeds to step S1708. In contrast, if it is determined that the required number "n" of images to be captured is not "1" (n is 2 or more), the processing proceeds to step S1707.

In step S1707, the combining unit 1603 combines the plurality of optical profiles acquired in step S1705. The optical profile combining processing in step S1707 is similar to the processing in step S205 according to the first exemplary embodiment described above. After step S1705, the processing proceeds to step S1708.

In step S1708, the evaluation value calculation unit 1604 calculates the orange peel evaluation value. In the third exemplary embodiment, when the required number "n" of images to be captured is one (n=1), the orange peel evaluation value is calculated based on the optical profile calculated based on one captured image. When the required number "n" of images to be captured is two or more, the orange peel evaluation value is calculated based on the combined profile that is calculated using the optical profiles calculated based on the n captured images and is generated in the combining processing of step S1707.

In step S1709, the output unit 1605 then outputs the orange peel evaluation value calculated in step S1708 to the display 115. The evaluation value output processing in step S1709 is similar to the processing in step S207 according to the first exemplary embodiment described above.

Operation of Number-of-Images Acquisition Unit

Figure 18:
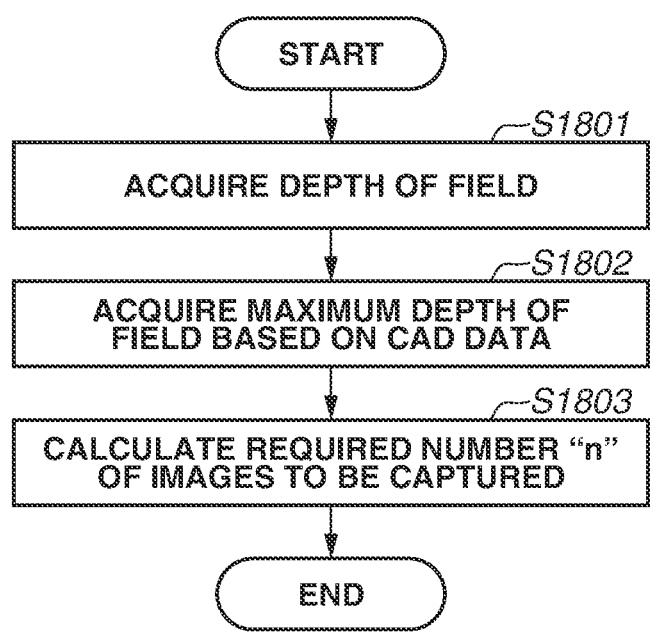
FIG. 18 is a flowchart illustrating combining determination processing according to the third exemplary embodiment.

An operation of the number-of-images acquisition unit 1606 will now be described in detail with reference to the flowchart illustrated in FIG. 18.

In step S1801, the number-of-images acquisition unit 1606 acquires image capturing conditions for the image capturing apparatus 111 based on the evaluation conditions designated in step S1702, and acquires a depth of field dof under the image capturing conditions. The depth of field dof is determined depending on a focal length and an F-value in the image capturing apparatus 111, and a distance to the object to be evaluated.

In the third exemplary embodiment, information indicating the relationship between the image capturing conditions and the depth of field is preliminarily stored as a database in the HDD 113. The number-of-images acquisition unit 1606 acquires information about the depth of field dof by searching the database based on the image capturing conditions during image capturing.

FIG. 19 is a table illustrating examples of the relationship between the image capturing conditions and the depth of field. Assume that table information indicating the correspondence relation illustrated in FIG. 19 is stored in the database. For example, in a case where image capturing is performed under the image capturing conditions that the focal length is 50 mm, the F-value is 10, and the distance from the image capturing apparatus 111 to the object to be evaluated is 1 m, the depth of field dof is 80 mm.

In step S1802, the number-of-images acquisition unit 1606 calculates a maximum depth difference in the evaluation target range based on the depth information. Specifically, the number-of-images acquisition unit 1606 calculates a maximum depth difference maxDepth by using the following formula (8). In formula (8), "D" represents depth information about the object to be evaluated that is calculated based on CAD data or the like, and "R" represents the evaluation target range designated in step S1702.

$$\mathrm{maxDepth} = \max_{x,y \in R} D(x, y) - \min_{x,y \in R} D(x, y). \tag{8}$$

In step S1803, the number-of-images acquisition unit 1606 calculates the number (the required number "n" of images to be captured) of optical profiles to be used for calculating the orange peel evaluation value. Specifically, the number-of-images acquisition unit 1606 performs a comparison operation between the depth of field dof and the maximum depth difference maxDepth as expressed by the following formula (9), thereby calculating the required number "n" of images to be captured.

$$n = \left\lceil \frac{\mathrm{maxDepth}}{dof} \right\rceil, \tag{9}$$

where $\lceil\ \rceil$ represents a ceiling function.

As described above, the image processing apparatus 1 according to the third exemplary embodiment calculates the number (the required number "n" of images to be captured) of optical profiles to be used for calculating the orange peel evaluation value based on depth information acquired from three-dimensional information, such as CAD data. In the third exemplary embodiment, the number of optical profiles to be used, or the required number of times of image capturing while shifting the focal position, can be determined before the image of the object to be evaluated is captured. Consequently, according to the third exemplary embodiment, the orange peel evaluation value can be accurately calculated with a minimum required number of captured images, which contributes to a reduction in the burden on the user.

In the second and third exemplary embodiments described above, information about the necessity for combining optical profiles, or information about the necessity for capturing a plurality of images while shifting the focal position, is not fed back to the user, in the case where it is determined that there is a need to combine optical profiles. However, it may be difficult to calculate the orange peel evaluation value in some cases even if a plurality of images is captured. For example, when the user captures images with a camera (image capturing apparatus 111) in the user's hand, it may be difficult to calculate the orange peel evaluation value based on the plurality of captured images. This is because the geometric conditions are slightly changed due to a hand shake or the like each time the user captures an image when the user captures images with the camera in the user's hand.

In a fourth exemplary embodiment, if it is determined that there is a need to combine optical profiles, or there is a need to capture a plurality of images, the user is therefore informed that there is a need to combine optical profiles, or there is a need to capture a plurality of images. The fourth exemplary embodiment then presents, to the user in a selectable manner, information indicating whether to evaluate orange peel in the evaluation target range on the object to be evaluated while capturing a plurality of images, or information indicating whether to evaluate orange peel based on one image by resetting the evaluation target range in which there is no need to capture a plurality of images.

The image processing apparatus 1 according to the fourth exemplary embodiment will now be described. A block diagram illustrating a functional configuration of the image processing apparatus 1 according to the fourth exemplary embodiment is similar to the block diagram illustrated in FIG. 11 according to the second exemplary embodiment described above. Only differences between the image processing apparatus 1 according to the fourth exemplary embodiment and the image processing apparatus 1 according to the second exemplary embodiment will be described below.

Image Processing According to Fourth Exemplary Embodiment

Figure 20:
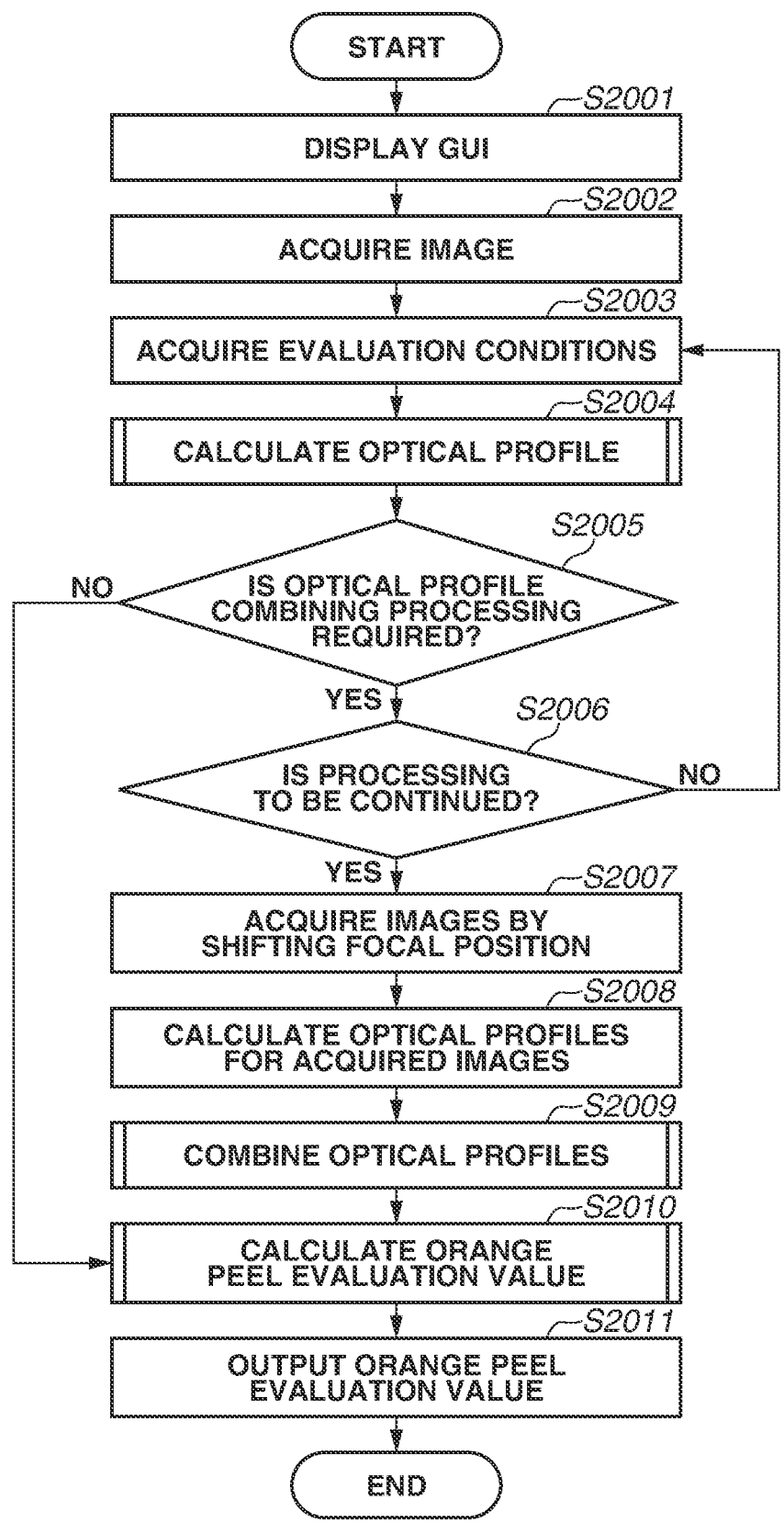
FIG. 20 is a flowchart illustrating image processing to be performed by an image processing apparatus according to a fourth exemplary embodiment.

FIG. 20 is a flowchart illustrating an image processing flow to be performed by the image processing apparatus 1 according to the fourth exemplary embodiment.

In step S2001, the CPU 101 of the image processing apparatus 1 executes a program (image processing application) according to the fourth exemplary embodiment stored in the HDD 113, thereby displaying the GUI 4 illustrated in FIG. 4 on the display 115. The processing in step S2001 is similar to the processing in step S1201 according to the second exemplary embodiment.

In step S2002, the image acquisition unit 1101 acquires images of the object to be evaluated that is captured by the image capturing apparatus 111 depending on the settings made by the user via the above-described GUI. According to the fourth exemplary embodiment, in step S2002, the image acquisition unit 1101 acquires one image captured without shifting the focal position, like in step S1202 according to the second exemplary embodiment.

In step S2003, the optical profile calculation unit 1102 and the evaluation value calculation unit 1105 acquire evaluation conditions set by the user via the GUI 4 illustrated in FIG. 4. The processing in step S2003 is similar to the processing in step S1203 according to the second exemplary embodiment. The evaluation target range designated by the user and the conditions for the evaluation value are acquired via the above-described GUI.

In step S2004, the optical profile calculation unit 1102 calculates the optical profile. The processing in step S2004 is similar to the processing in step S1204 according to the second exemplary embodiment.

In step S2005, the determination unit 1103 determines whether there is a need to combine a plurality of optical profiles. If it is determined that there is a need to combine optical profiles (YES in step S2005), the processing proceeds to step S2006. If it is determined that there is no need to combine optical profiles (NO in step S2005), the processing proceeds to step S2010.

In step S2006, the image acquisition unit 1101 causes a GUI for the user to check whether to continue the processing to be displayed on the display 115. Specifically, the image acquisition unit 1101 causes the GUI as illustrated in FIG. 21 to be displayed on the display 115. The processing of causing the GUI to be displayed on the display 115 can be performed separately by the CPU 101. On the GUI illustrated in FIG. 21, a text message to confirm if the user intends to continue the processing and buttons 2101 and 2102 are arranged. The button 2101 is a button to be pressed when it is determined that the user intends to continue the processing. The button 2102 is a button to be pressed when it is determined that the user intends to reset the evaluation target range instead of continuing the processing.

If the button 2101 is pressed by the user (YES in step S2006), the processing proceeds to step S2007. If the button 2102 is pressed by the user (NO in step S2006), the processing returns to step S2003.

In step S2007, the image acquisition unit 1101 acquires a plurality of images captured while shifting the focal position in the same manner as that for the first exemplary embodiment.

In step S2008, the optical profile calculation unit 1102 calculates optical profiles for the plurality of images acquired in step S2006 in the same manner as that for the first exemplary embodiment.

In step S2009, the combining unit 1104 combines the plurality of optical profiles acquired in step S2008. The optical profile combining processing in step S2009 is similar to the processing in step S205 according to the first exemplary embodiment.

In step S2009, the combining unit 1104 combines the optical profile acquired in step S2004 and the plurality of optical profiles acquired in step S2008. The optical profile combining processing in step S2009 is similar to the processing in step S1208 according to the second exemplary embodiment.

In step S2010, the evaluation value calculation unit 1105 calculates the orange peel evaluation value using the optical profile calculated in step S2004, if it is determined that there is no need to combine optical profiles in step S2005. If it is determined that there is a need to combine optical profiles in step S2005, the evaluation value calculation unit 1105 calculates the orange peel evaluation value using the combined profile calculated in step S2009. The evaluation value calculation processing in step S2010 is similar to the processing in step S1209 according to the second exemplary embodiment.

In step S2011, the output unit 1107 then outputs the evaluation value to the display 115. The evaluation value output processing in step S2011 is similar to the processing in step S1211 according to the second exemplary embodiment.

As described above, if there is a need to combine a plurality of optical profiles, the image processing apparatus 1 according to the fourth exemplary embodiment informs the user that there is a need to combine a plurality of optical profiles, thereby enabling the user to determine whether to continue the processing. According to the fourth exemplary embodiment, if it is difficult to capture a plurality of images, the orange peel evaluation value can thereby be calculated in a flexible way depending on the image capturing status of the user, for example, by capturing an image of a flat portion of the object to be evaluated and calculating the evaluation value again based on the captured image.

While the above-described exemplary embodiments illustrate an example where orange peel on the surface of the object to be evaluated is evaluated, the evaluation target is not limited to orange peel. The exemplary embodiments of the present disclosure can be applied to any other evaluation target.

According to an aspect of the present disclosure, it is possible to accurately evaluate the surface condition of any object, such as an object having a curved structure.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims the benefit of Japanese Patent Application No. 2022-062971, filed Apr. 5, 2022, which is hereby incorporated by reference herein in its entirety.

What is claimed is:

1. An image processing apparatus comprising:
one or more memories; and
one or more processors in communication with the one or more memories, wherein the one or more processors and the one or more memories are configured to:
acquire a depth of field of an image capturing apparatus;
acquire depth information about an object based on three-dimensional information about the object;
acquire a maximum depth difference of the object with respect to the image capturing apparatus based on the depth information;
calculate the number of images to be acquired based on a comparison between the depth of field and the maximum depth difference;
acquire, based on the number of images to be acquired, a plurality of images obtained by capturing images of the object at a plurality of focal positions;
acquire a plurality of optical profiles representing attributes of an image on a surface of the object based on the plurality of images;
combine the plurality of optical profiles to generate a combined profile; and
acquire an evaluation value representing a condition of the surface of the object based on the combined profile.

2. The image processing apparatus according to claim 1, wherein the one or more processors and the one or more memories are further configured to generate the combined profile by combining in-focus regions corresponding to focal positions of the image capturing apparatus in the plurality of optical profiles.

3. The image processing apparatus according to claim 1, wherein the one or more processors and the one or more memories are further configured to generate the combined profile by calculating contrast information based on the plurality of optical profiles and combining regions corresponding to portions where the contrast information is maximum in the plurality of optical profiles.

4. The image processing apparatus according to claim 3, wherein the contrast information is a variance value obtained by applying a predetermined variance filter to the plurality of optical profiles.

5. The image processing apparatus according to claim 1, wherein each of the plurality of optical profiles is information obtained by converting a variation in luminance of a projection pattern image on the surface of the object into a one-dimensional profile.

6. The image processing apparatus according to claim 5, wherein each of the plurality of optical profiles is information about luminance on an approximate straight line connecting edges of the projection pattern image on the surface of the object.

7. The image processing apparatus according to claim 1, wherein the evaluation value is a value for evaluating an uneven condition on the surface of the object.

8. The image processing apparatus according to claim 1,
wherein the plurality of images are obtained by capturing images of the object while the object is illuminated by an illumination image projected on the surface of the object, and
wherein the plurality of optical profiles represent attributes of the illumination image projected on the surface of the object.

9. The image processing apparatus according to claim 1, wherein the one or more processors and the one or more memories are further configured to determine a necessity of combining the plurality of optical profiles,
wherein in a case where the one or more processors and the one or more memories determine that the plurality of optical profiles are to be combined, the one or more processors and the one or more memories are configured to acquire the plurality of images and perform the combining.

10. The image processing apparatus according to claim 9, wherein the one or more processors and the one or more memories are further configured to calculate a maximum difference in contrast information based on the plurality of optical profiles corresponding to the plurality of images obtained by capturing images of the object, and determine a necessity of combining the plurality of optical profiles, based on a comparison between the maximum difference in the contrast information and a predetermined threshold.

11. The image processing apparatus according to claim 10, wherein the one or more processors and the one or more memories are further configured to set the predetermined threshold depending on evaluation accuracy required for the condition of the surface of the object.

12. The image processing apparatus according to claim 1, wherein the one or more processors and the one or more memories are further configured to determine a necessity for combining the plurality of optical profiles; and provide a user with a notification indicating that a plurality of images is to be captured by changing a focal position of an image capturing apparatus in a case where the one or more processors and the one or more memories determine that the plurality of optical profiles are to be combined.

13. An image processing method comprising:

acquiring a depth of field of an image capturing apparatus;

acquiring depth information about an object based on three-dimensional information about the object;

acquiring a maximum depth difference of the object with respect to the image capturing apparatus based on the depth information;

calculating the number of images to be acquired based on a comparison between the depth of field and the maximum depth difference;

acquiring, based on the number of images to be acquired, a plurality of images obtained by capturing images of the object at a plurality of focal positions;

acquiring a plurality of optical profiles representing attributes of an image on a surface of the object based on the plurality of images;

combining the plurality of optical profiles to generate a combined profile; and acquiring an evaluation value representing a condition of the surface of the object based on the combined profile.

14. A non-transitory computer-readable storage medium storing instructions that, when executed by a computer, cause the computer to perform an image processing method, the image processing method comprising:

acquiring a depth of field of an image capturing apparatus;

acquiring depth information about an object based on three-dimensional information about the object;

acquiring a maximum depth difference of the object with respect to the image capturing apparatus based on the depth information;

calculating the number of images to be acquired based on a comparison between the depth of field and the maximum depth difference;

acquiring, based on the number of images to be acquired, a plurality of images obtained by capturing images of the object at a plurality of focal positions;

acquiring a plurality of optical profiles representing attributes of an image on a surface of the object based on the plurality of images;

combining the plurality of optical profiles to generate a combined profile; and acquiring an evaluation value representing a condition of the surface of the object based on the combined profile.

* * * * *